(12) United States Patent
Kowal et al.

(10) Patent No.: US 7,212,978 B2
(45) Date of Patent: *May 1, 2007

(54) CUSTOMER VALUATION IN A RESOURCE PRICE MANAGER

(75) Inventors: David P. Kowal, Las Vegas, NV (US); John M. Boushy, Henderson, NV (US); Timothy J. Wilmott, Mays Landing, NJ (US)

(73) Assignee: Harrah's Operating Company, Inc., Las Vegas, NV (US)

( * ) Notice: Subject to any disclaimer, the term of this patent is extended or adjusted under 35 U.S.C. 154(b) by 399 days.

This patent is subject to a terminal disclaimer.

(21) Appl. No.: 09/989,929

(22) Filed: Nov. 20, 2001

(65) Prior Publication Data
US 2004/0158536 A1    Aug. 12, 2004

Related U.S. Application Data

(63) Continuation-in-part of application No. 09/658,366, filed on Sep. 8, 2000, which is a continuation-in-part of application No. 09/088,423, filed on Jun. 1, 1998, now Pat. No. 6,183,362.

(51) Int. Cl.
*G06Q 99/00* (2006.01)
*H04K 1/00* (2006.01)

(52) U.S. Cl. ............... 705/1; 705/5; 705/7; 705/10; 705/40; 340/825.28; 235/376

(58) Field of Classification Search ............ 705/40, 705/1, 5, 7, 10; 340/825.28; 235/376
See application file for complete search history.

(56) References Cited

U.S. PATENT DOCUMENTS

| | | | |
|---|---|---|---|
| 4,910,677 A | 3/1990 | Remedio et al. | |
| 5,255,184 A | 10/1993 | Hornick et al. | 364/407 |
| 5,270,921 A | 12/1993 | Hornick | 364/407 |
| 5,722,893 A | 3/1998 | Hill et al. | |
| 5,761,647 A | 6/1998 | Boushy | 705/10 |
| 5,918,209 A | 6/1999 | Campbell et al. | |
| 6,003,013 A | 12/1999 | Boushy et al. | 705/10 |
| 6,049,774 A | 4/2000 | Roy | 705/8 |
| 6,183,362 B1 | 2/2001 | Boushy | 463/25 |
| 6,253,187 B1 | 6/2001 | Fox | 705/10 |
| 6,263,315 B1 | 7/2001 | Talluri | 705/8 |
| 6,424,949 B1* | 7/2002 | Deaton et al. | 705/14 |

FOREIGN PATENT DOCUMENTS

| | | |
|---|---|---|
| JP | 404077958 A | 3/1992 |
| WO | WO 97/44750 | 11/1997 |

OTHER PUBLICATIONS

Casino Data Systems-Going Public the IPO Reporter, v17, n13, pN/A- Mar. 29, 1993.*

(Continued)

*Primary Examiner*—Kambiz Abdi
(74) *Attorney, Agent, or Firm*—Fenwick & West LLP

(57) ABSTRACT

A system that manages and optimizes total customer value on a property-specific basis and by further considering customer activities across multiple properties in a chain of properties.

16 Claims, 16 Drawing Sheets

OTHER PUBLICATIONS

Programmed for Perfection-(frequent guest programs)(Focus on Hotels special issue)- Ylinen, Jerry-Travel Weekly, v47, n38, p26(3)-Apr. 30, 1988.*

Musgrave, Gearld, L., "Entertainment Industry Economics: A Guide for Financial Analysis," Business Economics, vol. 33, No. 3, pp. 68-69, Jul. 1998.

"Going for Broke Casino Hotels Lure $100,000 Gamblers With Extravagant Suites," Arizona Republic (AR) Monday, Mar. 2, 1987, by Associated Press Edition, Final Section: Economy, p. c3.

Belobaba, P. P., "Application of a Probabilistic Decision Model to Airline Seat Inventory Control," Operations Research, vol. 37, No. 2, pp. 183-197, Mar.-Apr. 1989.

Bitran, G. R. and Mondschein, S. V., "An Application of Yield Management to the Hotel Industry Considering Multiple Day Stays," Operations Research, vol. 43, No. 3, pp. 427-443, May-Jun. 1995.

Brumelle, S. L., McGill, J. I., "Airline Seat Allocation with Multiple Nested Fare Classes," Operations Research, Operations Research Society of America, vol. 41, No. 1, pp. 127-137, Jan.-Feb. 1993.

Brumelle, S. L., McGill, J. I., Oum, T. H., Sawaki, K., and Tretheway, M. W., "Allocation of Airline Seats Between Stochastically Dependent Demands," Transportation Science, Operations Research Society of America, vol. 24, No. 3, pp. 183-192, Aug. 1990.

Chapman, S. N., and Carmel, J. I., "Demand/Capacity Management in Health Care: An Application of Yield Management," Health Care Management Review, vol. 17, No. 4, pp. 45-54, Fall 1992.

Curry, R. E., "Optimal Airline Seat Allocation with Fare Classes Nested by Origins and Destinations," Aeronomics Incorporated, pp. 1-22, Jun. 1989.

Curry, R. E., "Real-Time Revenue Management," Technical Brief, Aeronomics Incorporated, pp. 1-4, Second Quarter 1992.

Donaghy, K., McMahon, U., and McDowell, D., "Yield Management: an overview," International Journal of Hospitality Management, vol. 14, No. 2, pp. 139-150, 1995.

Dunn, K. D., and Brooks, D. E., "Profit Analysis: Beyond Yield Management," The Cornell Hotel and Restaurant Administration Quarterly, vol. 31, No. 3, pp. 80-90, Nov. 1990.

Hanks, R. D., Cross, R. G., and Noland, R. P., "Discounting in the Hotel Industry: A New Approach," The Cornell Hotel and Restaurant Administration Quarterly, vol. 33, No. 1, pp. 15-23, Feb. 1992.

Harris, F. H. and Peacock, P., "Hold My Place, Please" Yield Management Improves Capacity-Allocation Guesswork, Marketing Management, vol. 4, No. 2., pp. 34-46, Fall 1995.

Jauncey, S., Mitchell, I., and Slamet, P., "The Meaning and Management of Yield in Hotels," International Journal of Contemporary Hospitality Management, vol. 7, No. 4, pp. 23-26, 1995.

Kimes, S. E., "Yield Management: A Tool for Capacity-Constrained Service Firms," Journal of Operations Management, vol. 8, No. 4, pp. 348-363, Oct. 1989.

Kuyumcu, A. H., "Gaming with Revenue Management," Talus Solutions, Inc., Scorecard Growth Strategies for the Information Age, Technical Brief, pp. 1-8, Summer, 2000.

Lieberman, W. H., "Debunking the Myths of Yield Management" [online] [retrieved on May 15, 2001]. Retrieved from the Internet: <URL: www.abovetheweather.com/ym_myths.pdf>. (First appeared in The Cornell H.R.A. Quarterly, pp. 34-41, Feb. 1993).

Orkin, E. B., "Boosting Your Bottom Line with Yield Management," The Cornell Hotel and Restaurant Administration Quarterly, vol. 28, No. 4, pp. 52-56, Feb. 1988.

Orkin, E. B., "Strategies for Managing Transient Rates," The Cornell Hotel and Restaurant Administration Quarterly, vol. 30, No. 4, pp. 34-39, Feb. 1990.

Relihan III, W. J., "The Yield-Management Approach to Hotel-Room Pricing," The Cornell Hotel and Restaurant Administration Quarterly, vol. 30, No. 1, pp. 40-45, May 1989.

Vinod, B., "Reservation Inventory Control Techniques to Maximize Revenues," The Third International Airline Yield Management Conference, Dec. 3, 1990.

Weatherford, L. R., "Using Prices More Realistically as Decision Variables in Perishable-Asset Revenue Management Problems," Abstract, Journal of Combinatorial Optimization [online]. Oct. 1997, 1(3):277-304. [retrieved on May 15, 2001]. Retrieved from the Internet: <URL: http://www.wkap.nl/oasis.htm/144927>.

Wollmer, R. D., "An Airline Seat Management Model for a Single Leg Route When Lower Fare Classes Book First," Operations Research, vol. 40, No. 1, pp. 26-37, Jan.-Feb. 1992.

* cited by examiner

| Prop ID | Hotel_Only Flag Value | Min Hotel Trips Req | Property's Default TW | Unknown customer Multiplier | Default ADR |
|---|---|---|---|---|---|
|  |  |  |  |  |  |
|  |  |  |  |  |  |

3532

**Fig. 8
Property-Specific Flags and Values**

| Prop ID | Customer's Source code | Source Code's Default TW |
|---|---|---|
|  |  |  |
|  |  |  |

3534

**Fig. 9
Default Values in this Source Code**

| Prop ID | Min Daily Theoretical | Max Daily Theoretical | Game Type | Factor |
|---|---|---|---|---|
|  |  |  |  |  |
|  |  |  |  |  |

3536

**Fig. 10
Daily Profit Determination**

| Prop ID | Min Adjusted Daily Revenue | Max Adjusted Daily Revenue | Num Nights Reserved | Factor |
|---|---|---|---|---|
| | | | | |
| | | | | |

Fig. 11
Nightly Profit Determination

| Prop ID | Control Segment | Customer segment | Known Flag | Min Nightly Profit | Max Nightly Profit | Incented Flag | Min Actual Room Cost | Max Actual Room Cost | Rate Descriptor |
|---|---|---|---|---|---|---|---|---|---|
| | | | | | | | | | |
| | | | | | | | | | |

Fig. 12
Control Segments and customer segments

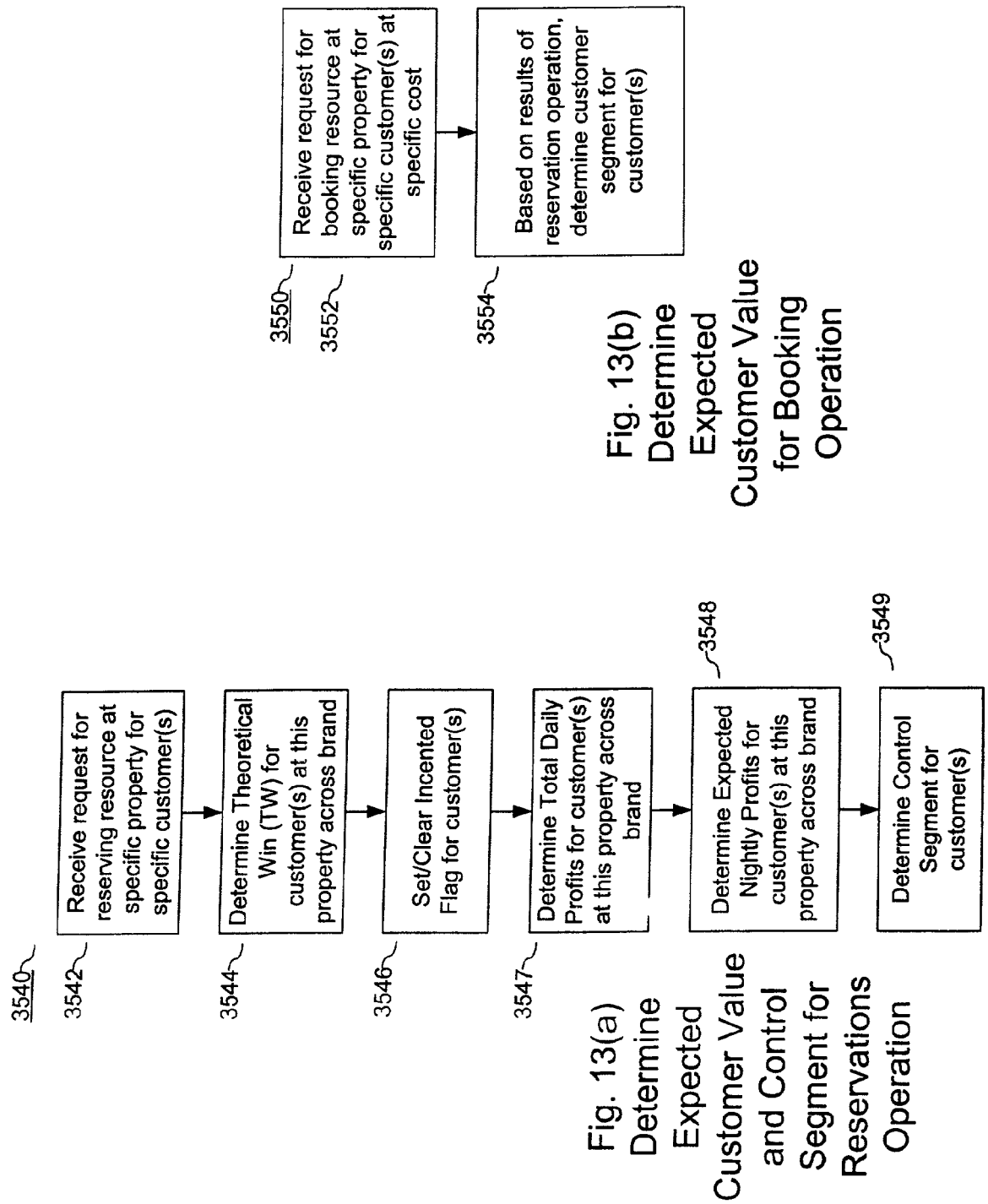

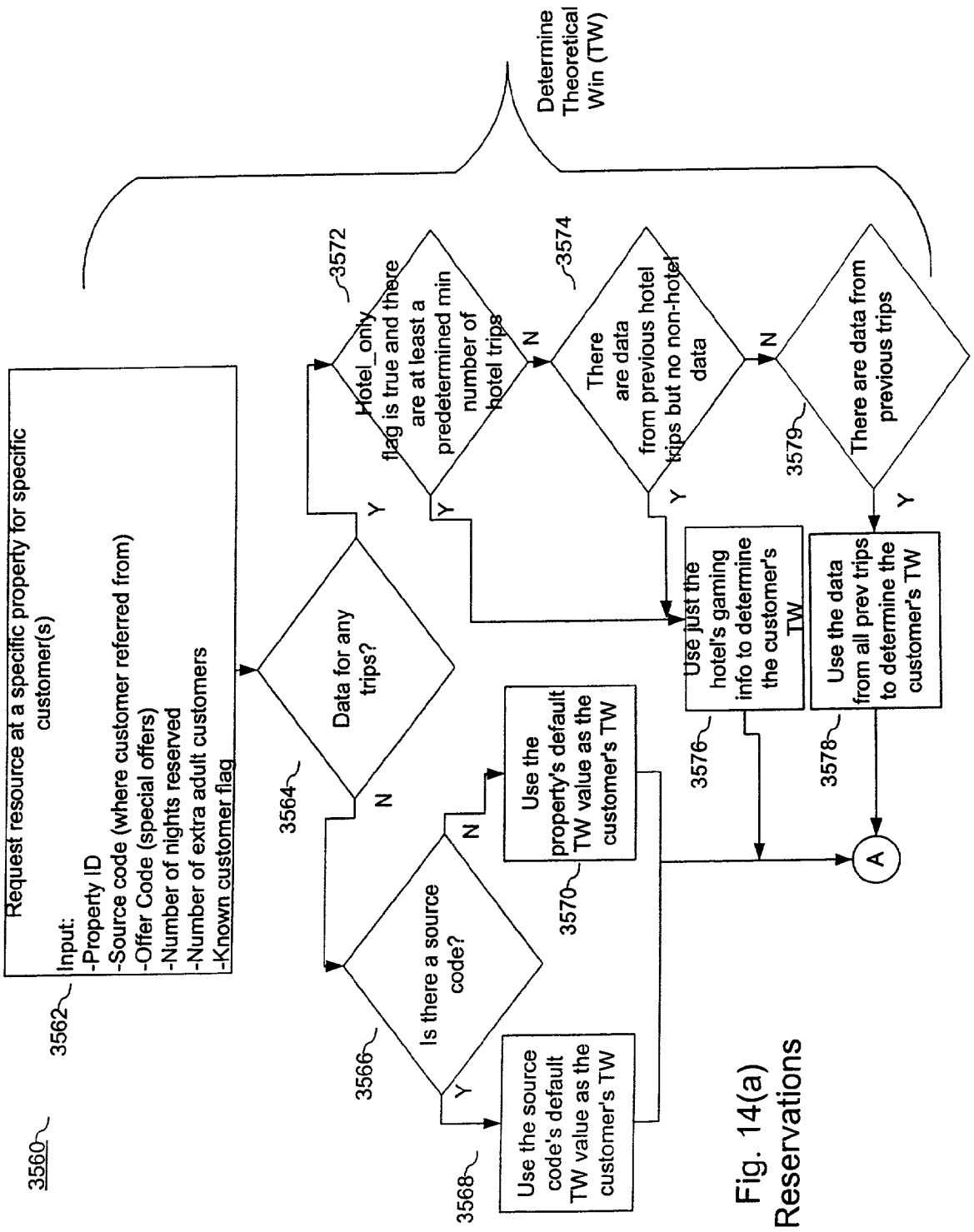
Fig. 14(a) Reservations

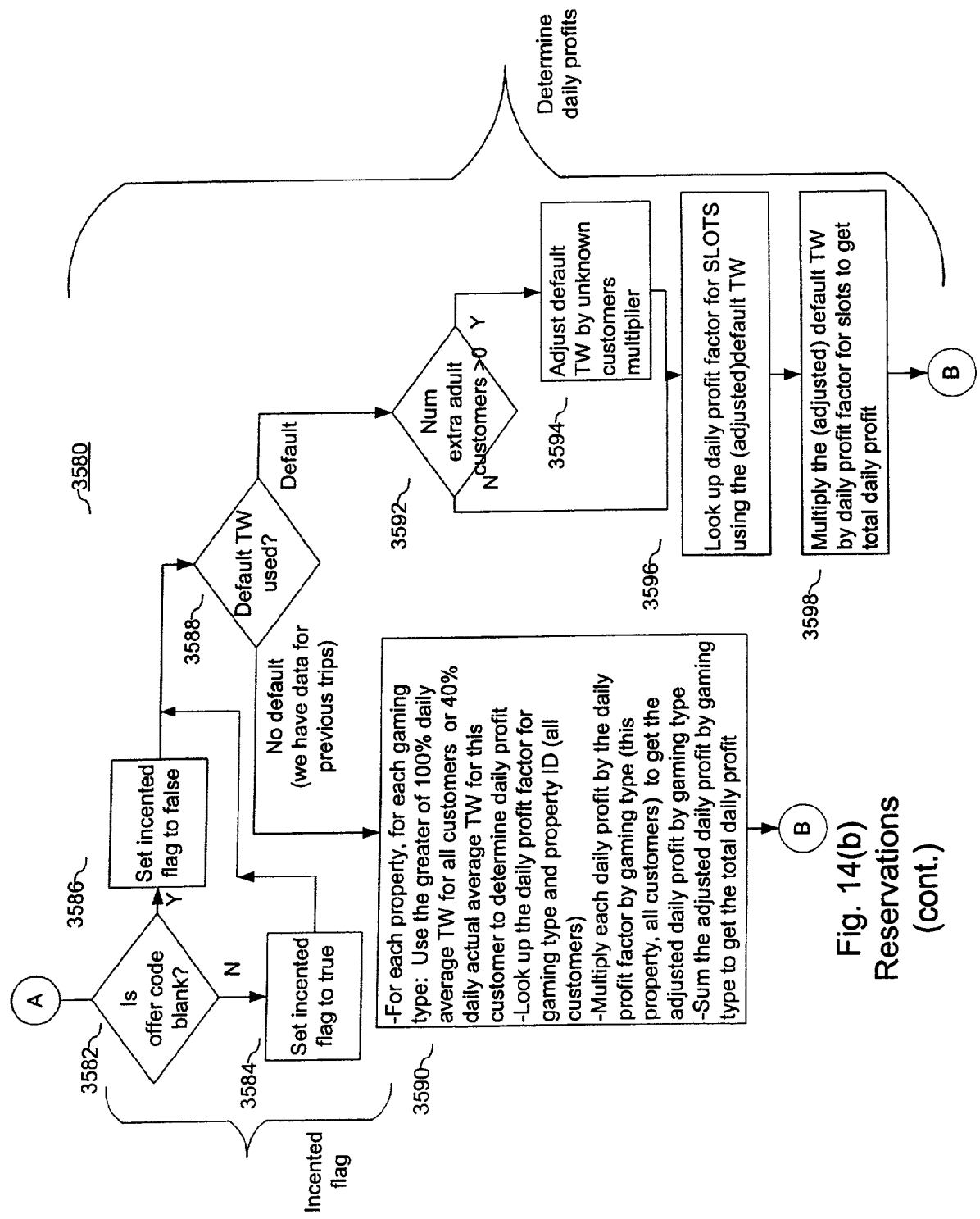
Fig. 14(b) Reservations (cont.)

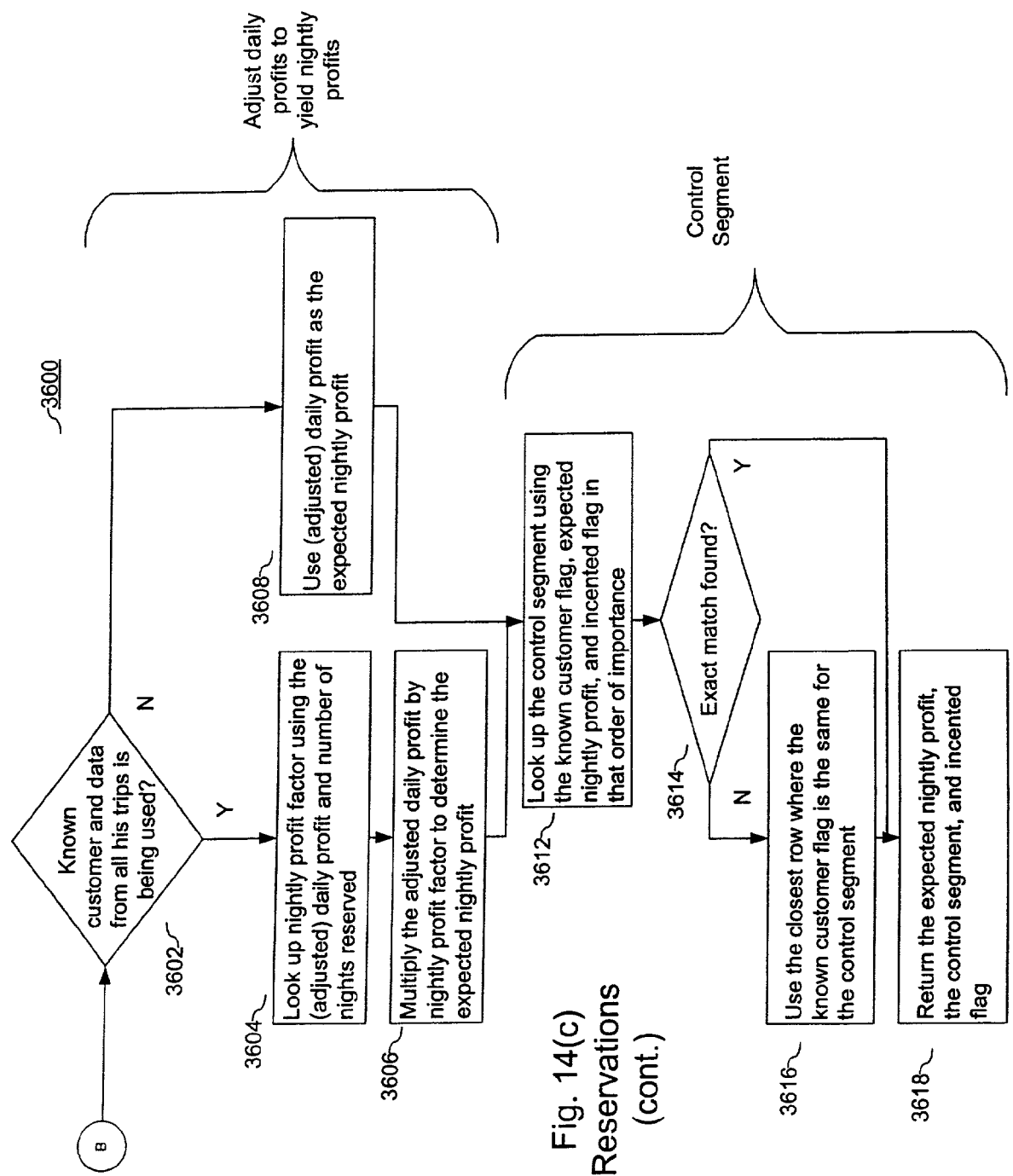
Fig. 14(c) Reservations (cont.)

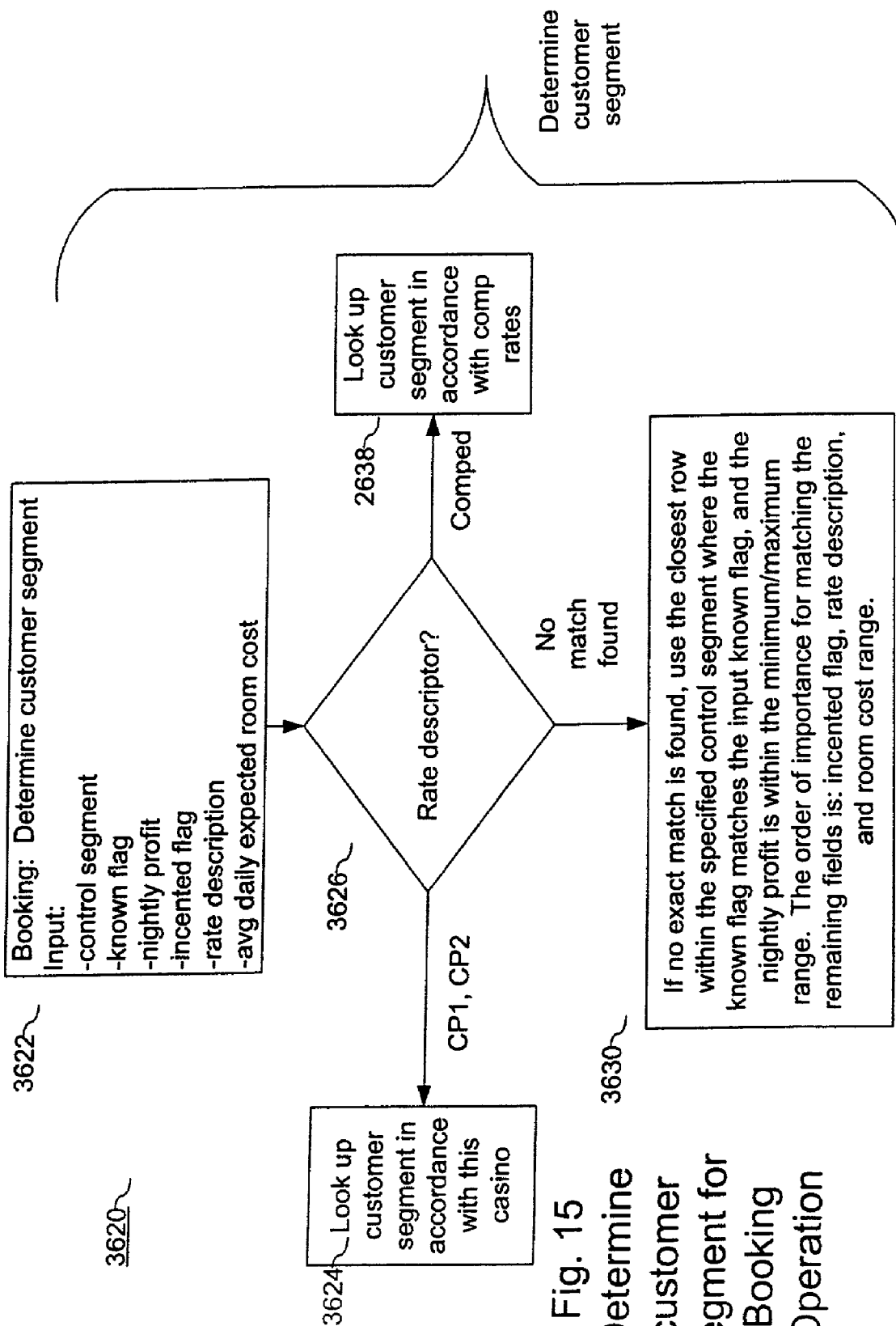
Fig. 15 Determine customer segment for Booking Operation

CUSTOMER VALUATION IN A RESOURCE PRICE MANAGER

CROSS-REFERENCE TO RELATED APPLICATIONS

The present application is a continuation-in-part of U.S. patent application Ser. No. 09/658,366, for "Resource Price Management Incorporating Indirect Value," filed Sep. 8, 2000, which is a continuation-in-part of U.S. patent application Ser. No. 09/088,423, for "National Customer Recognition System and Method," filed Jun. 1, 1998, issued as U.S. Pat. No. 6,183,362, both of which are incorporated herein by reference.

The present application is related to U.S. Pat. No. 5,761,647, for "National Customer Recognition System and Method," filed May 24, 1996, issued on Jun. 2, 1998, the disclosure of which is incorporated herein by reference.

The present application is further related to U.S. Pat. No. 6,003,013, for "Customer Worth Differentiation by Selective Activation of Physical Instrumentalities Within the Casino," filed May 29, 1998, issued on Dec. 14, 1999, the disclosure of which is incorporated herein by reference.

BACKGROUND OF THE INVENTION

1. Field of the Invention

The present invention is related to resource and revenue management, and more particularly to a system and method of determining a value of a customer based on past activities of the customer.

2. Description of the Background Art

In many industries, providers of products and/or services fail to take into account indirect value that derives from the sale of the product or service, when determining a price for a particular customer or customer segment. Examples of such indirect value include advertising revenue, increased sales of related or unrelated goods or services, increased website traffic, increased revenue from related or unrelated business enterprises, and the like. Though such sources of indirect value can be quantified based on customer segment, demographic and/or psychographic categorization, observed or predicted behavior, and the like, existing revenue management systems fail to take into account such sources of indirect value in a systematic manner when determining whether or not to offer a resource to a particular customer or customer segment, or when determining a price point for offering such a resource to a particular customer or customer segment.

One example where such indirect value is a substantial component of overall profitability is the casino/hotel industry. Casinos and hotels are often affiliated with one another, and in many cases are operated by the same company. Most casino/hotel operators recognize that potential income from the casino often far exceeds income from renting rooms at the hotel; yet the hotel component of the business endeavor is a necessary element to attract customers. Thus, many such operators are content to make little or no profit (or even lose money) on their room prices in order to attract customers; the operators rely on increased casino profits from these customers to offset the discounted room prices. As a common enterprise, casino/hotel operators are primarily interested in maximizing total profits, and are willing to take a loss on the hotel operations in order to achieve a greater total profit.

In general, customers may be divided into segments having distinct characteristics and potential revenue or other value. For example, overnight visitors generate higher gaming revenues (i.e., provide greater gaming value) than do day trip visitors. A visitor on an overnight trip tends to do the largest share of his or her gaming at the casino associated with his or her hotel. Accordingly, casino/hotel operators whose hotel customers include those overnight visitors having the highest gaming value generally enjoy the highest casino revenues.

In many areas where gaming is prevalent, hotel rooms are scarce, and customers are often turned away. Casino/hotel operators try to determine how many rooms to rent at which price points, in an attempt to maximize revenue. Conventionally, room prices vary based on several factors, including class of room, special events, and availability. Operators forecast the number of rooms in demand at future dates, and set room prices based on these factors. Thus, for periods of high demand, higher room prices may be charged.

However, conventional techniques for setting room prices fail to take into account the potential gaming value of particular customer segments as compared with other customer segments. For example, higher-rated gaming players (i.e., those that belong to a customer segment associated with a higher level of casino profits) are more valuable to a casino/hotel operator than are lower-rated gaming players or non-players. Industry analysis has shown that 26% of casino customers provide 82% of gaming revenues. Thus, where accommodations are scarce, it would be advantageous for hotel/casino operators to favor higher-value customers over lower-value customers. Conventional room pricing methods fail to take into account the relative gaming value of customers.

Furthermore, many higher-rated gaming players book room reservations relatively late, within only a few days of their intended stay. If a hotel is already full by the time the higher-rated player wishes to book a room, the higher-rated player will be turned away. The result is that the room is occupied by a lower-valued customer (who booked earlier) instead of the higher-valued customer. A net loss in total revenues results, due to the failure to take into account the gaming value of each potential hotel customer when pricing or offering the room. Indeed, in some cases, it may be desirable not to rent the room to a lower-valued customer at all, and instead hold open the room for a possible later-booking higher valued customer.

In addition, current systems, both in the casino/hotel industry and in other industries fail to take into account total potential customer value, including indirect value, in determining whether or not to target a marketing campaign at a customer or customer segment, based on indirect value for the customer or customer segment, or on total value including direct and indirect value. As a result, services and/or goods are offered to potential customers without regard to a determined or estimated total value, including indirect value. As a result, such businesses suffer from misallocation of scarce resources, as well as a lack of optimization and profit maximization.

The profitability model varies at various casinos. For example, a casino in Lake Tahoe casino is usually full. Such a casino is more profitable than a casino with fewer customers and, therefore, needs to give fewer incentives for customers to attend. When determining a room rate, different casinos would categorize the same potential customer differently, depending on how much the casino wants to fill its rooms. For example, a casino that is mostly full would provide very few comps and would only comp potential customers who are highly profitable. In contrast, casinos that are less full would comp the highly profitable customers and, in addition, would comp additional, less profitable customers because, even though those customers are not as profitable, it is still desirable to fill more rooms.

In the past, resource management systems have not accounted for variations in properties when categorizing customers and/or setting room prices.

Certain gaming types are more lucrative than other types. For example, table games such as keno and blackjack are more profitable for a casino than slot machines. In the past, casinos have valued customers who spent $200 at the slot machines the same way that they have valued customers who spent $200 at table games. This valuation is not optimum, since the table game players make more money for the casinos and are to be encouraged to come to the casinos and play more than slot machine players.

In addition, certain casinos do not have all types of games. For example, many casinos on Indian reservations do not have table games. Thus, a customer who only plays table games would not be as valuable to this type of casino. It would be desirable to take differences in casinos into account when categorizing customers based on their past actions.

SUMMARY OF THE INVENTION

An embodiment of the present invention manages and optimizes total customer value on a property-specific basis and by further considering customer activities across multiple affiliated properties in a chain of properties. For example, the customer valuation system may determine a customer's value by looking at the customer's activities for all affiliated casinos in a casino chain. Similarly, the customer valuation system may determine a customer's value by looking at the customer's activities for all casinos in a chain of hotels and casinos. Similarly, the customer valuation system may determine a customer's value by looking at the customer's activities in some, but not all of the casinos in a chain.

In an embodiment, a customer valuation is first determined at reservation time. The customer value is based on an expected average profit for a customer based on the customer's activities in multiple hotels/casinos in a chain of hotels/casinos. Once an expected average profit is determined for the customer, based on his past activities, a control segment is determined for the customer, depending on which property he is interested in. A reservation management system uses the control segment to determine possible room rates that might be offered to the customer based on his control segment. The same customer activities may result in the customer being categorized into differing control segments for different properties.

The present invention can be applied to allocation and pricing for any resource having multiple quantifiable sources of value, such as direct and indirect value that are capable of being determined, estimated, or predicted. For example, tickets to entertainment events, hotel services, and other resources may be dynamically priced, taking into account indirect value such as shopping, dining, and the like, for the customer or customer segment. The determined indirect value may be based on demographic and/or psychographic characteristics, observed and/or predicted behavior, or other factors.

The present invention further provides functionality for targeting marketing efforts. By taking into account a determined or estimated indirect value for a customer or customer segment, the invention determines whether or not to target a marketing campaign at a customer or customer segment, and determines an offer price for the customer or customer segment.

In one embodiment, the indirect values for multiple customers can be combined as inputs into the resource manager. For example, when a customer is booking a room at a hotel, it is typical that there are several others in the customer's party. Each of these members of the customer's party is a source of indirect revenue to the hotel operator, for example, from their gaming or other activity. Accordingly, to better price the hotel room offered to the customer, in one embodiment, the indirect value of each member of the customer's party is obtained. This can be done by looking up in database, or computing, the indirect value of each member of the customer's party. In an embodiment where the indirect value is measured by the gaming value of the customer, such as the customer's theoretical win amount, the indirect values of all members of the party can be used to affect (weighted or unweighted) a single indirect value. In one embodiment, the indirect values are combined. In another embodiment, the indirect values of one customer is increased in accordance with the number of additional customers in the room.

In various embodiments, selected historical transactional or behavioral information about the customer is used to generate an indirect value for using in pricing the requested resource. In one embodiment, the customer's indirect value is derived from prior transactions between the customer and the provider of the resource. In the embodiment where customer is being offered a room at a hotel and casino, the indirect value can be derived from the customer's gaming at the casino (or affiliated casino properties). Here, the indirect value is based at least on the customer's theoretical win. When a customer stays at a hotel, his indirect value is higher, since customers tend to gamble more at the hotel, and also shop and eat more at the hotel. When the customer merely games at the hotel without lodging there, their indirect value is typically lower. Accordingly, in one embodiment, when pricing a hotel room for a customer, the indirect value of the customer is determined only from prior stays at a hotel property, and excludes indirect value from those trips where the customer did not stay at the hotel.

BRIEF DESCRIPTION OF THE DRAWINGS

FIG. 7(*b*) is a flow chart of three contexts in which a customer valuation method and system might be used.

FIG. 8 shows a data structure used by the customer valuation method and system containing property-specific flags and values.

FIG. 9 shows a data structure used by the customer valuation method and system and containing values associated with a customer source code.

FIG. 10 shows a data structure used by the customer valuation method and system and containing values associated with a daily profit determination.

FIG. 11 shows a data structure used by the customer valuation method and asystem and containing values associated with a nightly profit determination.

FIG. 12 shows a data structure used by the customer valuation method and system and containing values associated with control segments and customer segments.

FIG. 13(a) is a flow chart showing an overview of the customer valuation method used with a reservations operation.

FIG. 13(b) is a flow chart showing an overview of the customer valuation method used with a booking operation.

FIGS. 14(a)–14(c) are flow charts showing details of the customer valuation method used with a reservations operation.

FIG. 15 is a flow chart showing details of the customer valuation method used with a booking operation.

Figure 1:
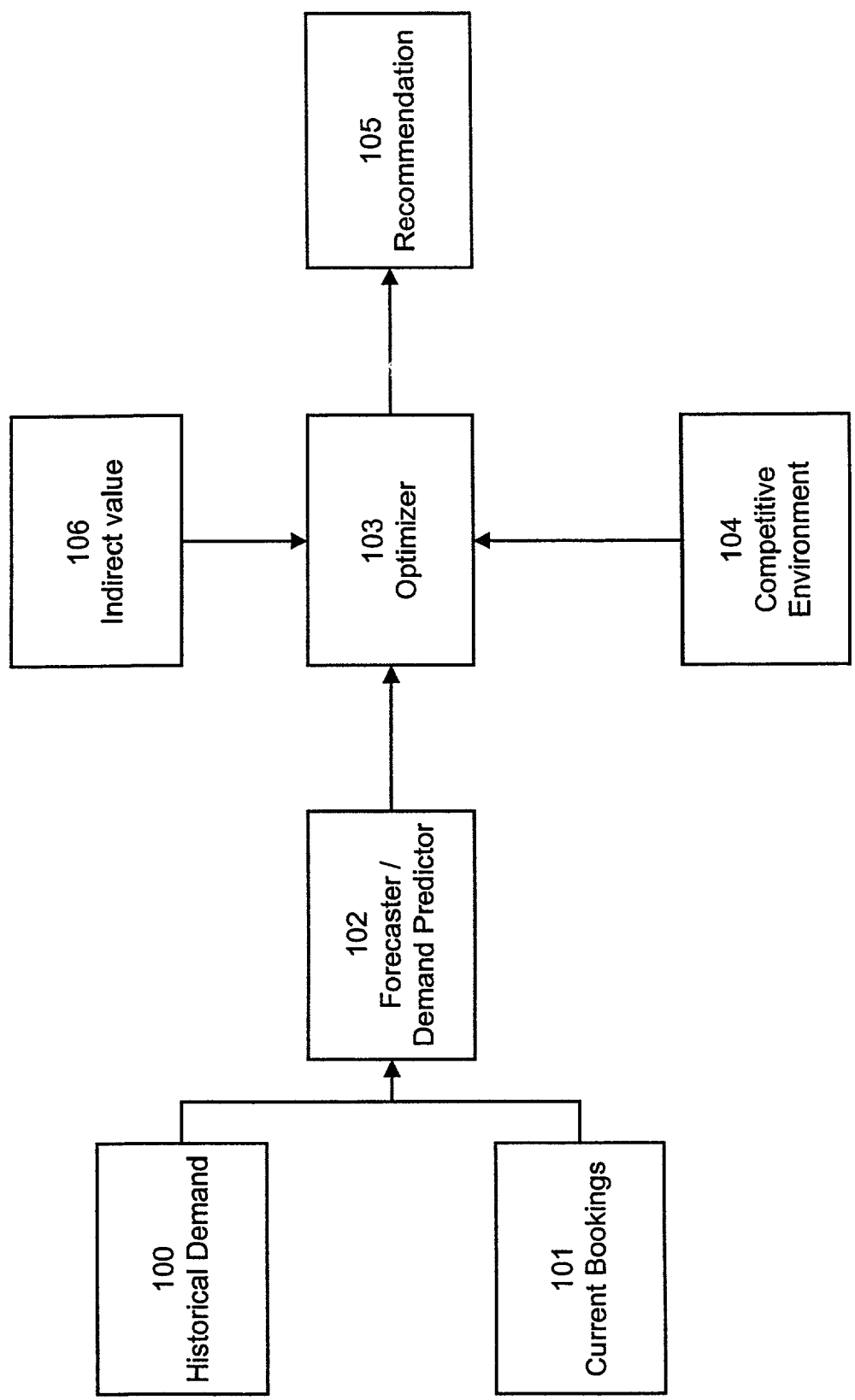
FIG. 1 is a conceptual block diagram of the functional components of the invention according to one embodiment.

The drawings provided herein are merely illustrative of one embodiment of the invention. One skilled in the art will recognize that many other architectures, process implementations, and screen designs are possible without departing from the spirit or essential characteristics of the invention.

DETAILED DESCRIPTION OF THE PREFERRED EMBODIMENTS

Definitions

For the purposes of the following description of the preferred embodiments, the following terms are defined. These definitions are not intended to limit or restrict the scope of the present invention, whose scope is defined solely by the claims.

Resource: A quantifiable, saleable commodity or service that is typically provided to a customer in exchange for payment. In the context of this invention, resources are assumed to be finite in quantity and/or availability. Examples: hotel rooms, air travel, concert tickets, soap, tomatoes.

Value: Quantifiable benefit to the provider of the resource, deriving directly or indirectly from a customer's consumption of the resource. Examples: revenue, profits, advertising exposure, public relations.

Customer segment: A subset of customers or potential customers, based on some common characteristic. May include zero or more customers or potential customers. Any number of customer segments may be defined for the set of all customers or potential customers.

Direct value (primary value): Revenue, profit, or other value collected directly from customers and deriving directly from sale of the resource. Examples: room rates (for hotel rooms), airfare (for air travel), selling price (for goods). May be measured, for example, in terms of gross revenue or profits; may or may not take into account costs of providing the resource.

Indirect value (secondary value): Any additional revenue, profit, or other value, aside from the direct value, that results from the customer's purchase, consumption, or use of a resource. Examples: gaming revenue resulting from a hotel room stay, advertising exposure resulting from purchases of associated goods, expected gift shop revenue resulting from a theme park admission. May be measured, for example, in terms of gross revenue or profits; may or may not take into account costs of providing the resource. May represent value associated with an increased probability of additional revenue. May be determined on an individual customer-by-customer level, or on a segment-by-segment level.

Actual indirect value: Measured indirect value (such as revenue) for a particular customer or customer segment, determined for example from past resource use, purchases, consumption or transactions.

Expected (or predicted) indirect value: Indirect value that can be reasonably expected from a particular customer or customer segment for a particular purchase, consumption, use, or transaction. Expected indirect value may be based, for example, on one or more of actual indirect value (such as revenue from past purchases) and/or predictions based on any available information about the customer or customer segment, such as demographic characteristics, psychographic characteristics, and/or specific historical transactions. In one embodiment, the expected indirect value is determined using a predictive model.

Total actual value: The sum of direct value and actual indirect value.

Total expected value: The sum of direct value and expected indirect value.

Functional Components

The following description illustrates the invention in the context of a system for of allocating and pricing hotel rooms by taking into account gaming value of potential hotel customers. However, the present invention can be applied to allocation and pricing for any resource having a source of indirect value, and is not intended to be limited to hotel room management and pricing. Accordingly, the context of the following description is not intended to limit in any way the scope of the invention, which is defined solely by the claims.

In one embodiment, the present invention takes into account multiple sources of value, including direct and indirect value, in order to determine how to allocate and price hotel rooms for a casino/hotel operation. The indirect value may be determined based on actual historical data tracking, predictive modeling, estimates, demographics, psychographics, and/or any other relevant factors. Customer segmentation may be employed in order to determine and provide such indirect value measurements.

Referring now to FIG. 1, there is shown a conceptual block diagram of the functional components of the invention according to one embodiment. In one embodiment, the various functional elements of FIG. 1 are implemented as software components running on a conventional personal computer, as is known in the art.

Optimizer 103 generates a recommendation 105 in response to a resource request for a particular customer or customer segment. Recommendation 105 includes, for example, an indication as to whether the resource should be made available to the customer or customer segment, and/or a recommended price for the resource.

For illustrative purposes, FIG. 1 shows examples of the types of input that may be provided to optimizer 103 in generating recommendation 105. One skilled in the art will recognize that the illustrated input types are merely exemplary, and that other factors may be taken into account in generating recommendation 105. In the illustrated embodiment, historical demand 100 and current bookings 101 are provided to a forecaster/demand predictor 102, which forecasts demand for particular customer segments. Indirect value 106 (such as customer gaming value), along with forecasted demand developed by predictor 102, are provided to optimizer module 103. As described above, indirect value may represent actual measured value, estimated value, or any combination thereof. Indirect value 106 may be provided according to individual customers, or according to customer segments, as desired. A further input that may be provided to optimizer 103 is an indicator of competitive market pressures or other environmental factors, such as prices for similar resources available from competitors (e.g. room prices at competing hotels). Additional input and adjustments may also be provided such as for example an indication of expected or actual demand cycles, so as to increase prices when demand is strong.

Taking into account input from predictor 102, indirect value 106, and data describing the competitive environment 104), optimizer 103 generates a recommendation as to the appropriate resource allocation and prices, in order to maximize total value. Recommendation 105 may be in the form of a price to offer to a customer, or a recommendation that the resource not be made available to the customer.

Thus, in the context of a casino/hotel operation, recommendation 105 ensures availability for high-gaming-value customers when appropriate, and makes appropriate trade-offs to ensure availability for mid-gaming-value customers when appropriate.

Resource Pricing

Figure 2A:
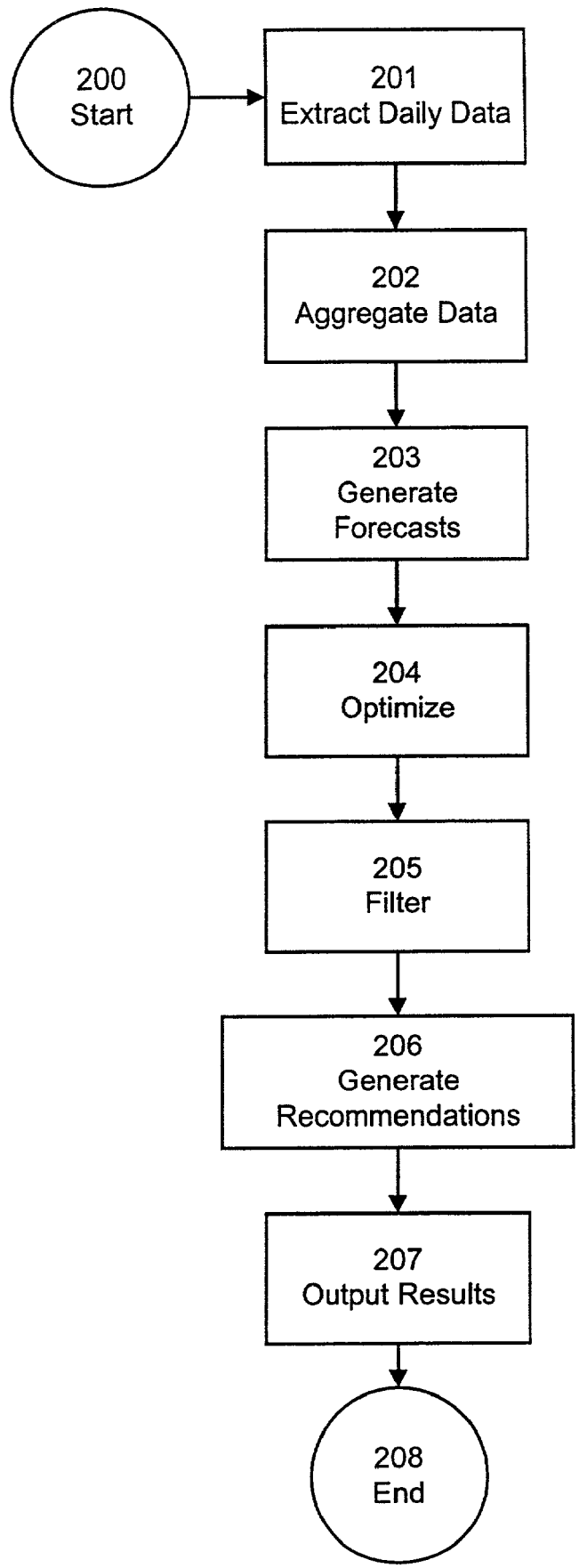
FIG. 2A is a flow chart showing overall operation of a revenue management system employing the present invention.
Figure 2B:
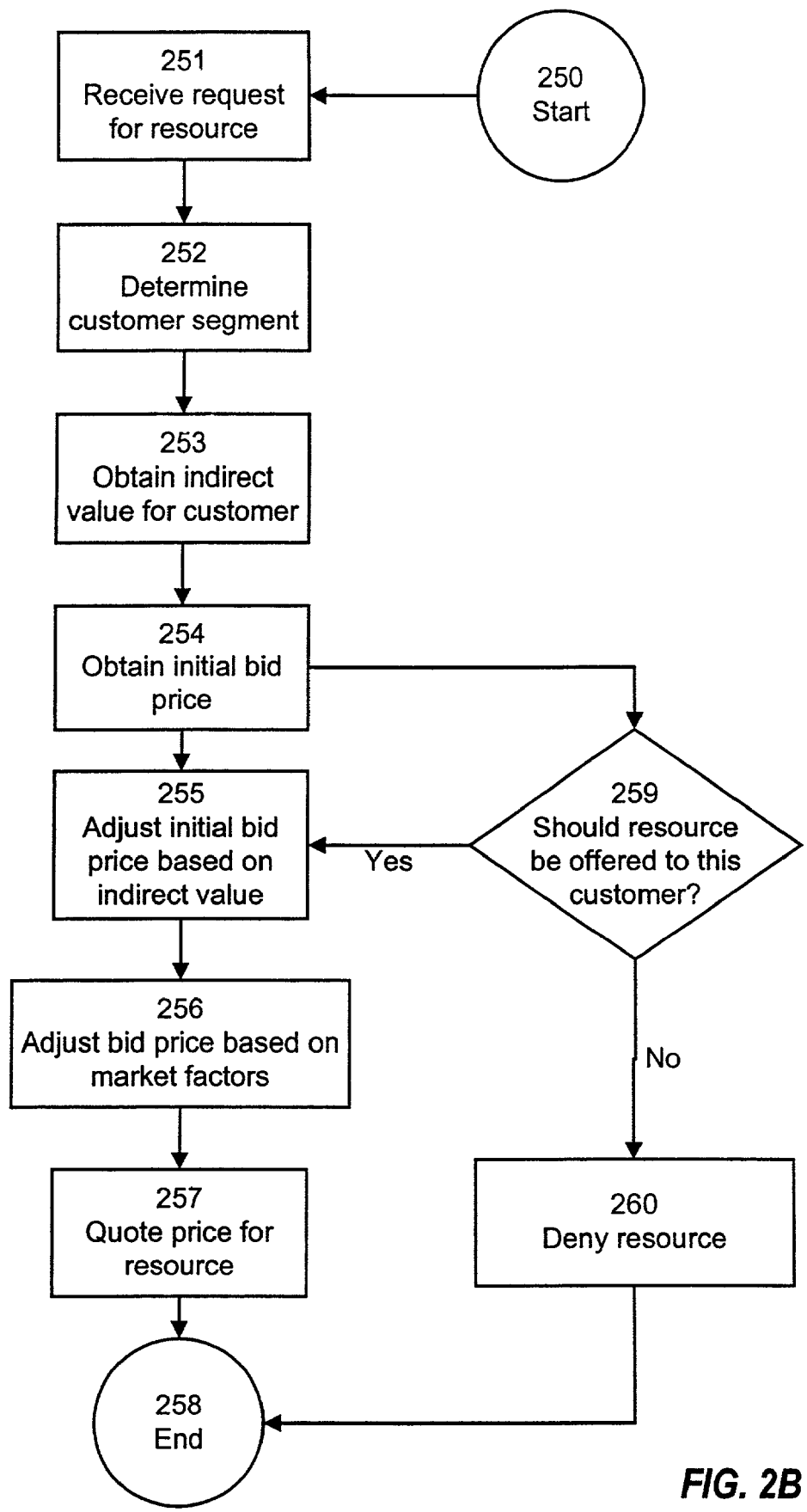
FIG. 2B is a flow chart showing a process of generating a price for a resource according to one embodiment of the present invention.

Referring now to FIG. 2B, there is shown a flow chart depicting a process of generating a price for a resource according to one embodiment of the present invention. In the context of a casino/hotel operation, for example, the steps of FIG. 2B may be performed when a customer, potential customer, or sales agent requests a hotel room at a particular hotel property.

The request for the resource (such as the hotel room) is received 251 by the system. In one embodiment, a customer segment for the customer is determined 252. The segment may be defined, for example in terms of various characteristics of the customer. As described in more detail below, these characteristics may include behavioral, demographic, psychographic, or other descriptive factors. Customer segmentation allows the resource pricing implemented by the present invention to be performed on a segment-by-segment basis, so that once a particular customer's segment is determined, an offer price can be generated based on the indirect value associated with the customer segment. However, one skilled in the art will recognize that customer segmentation is not required, and that resource allocation and pricing recommendations may be made for individual customers without employing customer segments and without departing from the essential characteristics of the present invention.

Based on the customer segment (or, alternatively, based on information describing the individual customer), an indirect value for the customer is determined 253. In the context of the casino/hotel operation, such indirect value may represent, for example, gaming revenue that is expected to result from the customer's stay at the hotel. Other types of indirect value may also be determined, as described above. The indirect value may be an expected or actual value, and may be determined based on statistical, predictive, empirical, or other methods.

An initial bid price is obtained 254 for the resource being requested by the customer. This price is determined by conventional means, and may be based on any combination of factors, such as the type of resource, availability, demand, competitive market forces, promotions, and the like. Thus, the initial bid price represents the unadjusted price that would normally be charged for the resource, without taking into account indirect value of a particular customer or customer segment. In one embodiment, the initial bid price is adjusted by various mechanisms, as described in more detail below.

The system then determines 259 whether the resource should be offered to the customer making the request. In one embodiment, this determination is made based on the indirect value of the customer; thus, a customer would only be offered the resource if his or her indirect value (expected or actual) exceeded a threshold value. The threshold value may be fixed, or may depend on availability, day of week, season, or other factors. Thus, in the casino/hotel example, a room might be offered to a customer only if the expected or actual gaming revenue from the customer exceeded a threshold value.

In an alternative embodiment, the determination in step 259 is made based on the total value of the customer, taking into account both direct and indirect value. A total value is determined by combining the initial bid price with the (expected or actual) indirect value, and adjusting the bid price if appropriate. If and only if the total value exceeds a threshold, the resource is offered to the customer. FIGS. 7–16 show an example of a customer valuation method for determining one type of indirect value.

If in step 259 a determination is made that the resource should not be offered to the customer, the resource is denied 260 to the customer.

If in step 259 a determination is made that the resource should be offered to the customer, the system, in one embodiment, adjusts 255 the initial bid price to take into account the indirect value of the customer. Such an adjustment may be made, for example, by subtracting the indirect value (adjusted by a multiplier value, if desired) from the initial bid price. A minimum adjusted bid price may be set. In an alternative embodiment, step 255 is not performed, and the system does not adjust the initial bid price.

In one embodiment, the system performs the optional step of adjusting 256 the bid price further, to account for market factors such as competitive pressures. For example, if competing hotels are offering rooms at lower prices, the bid price for a room may be adjusted downward in order to remain competitive.

Once all desired adjustments have been made, the resource is offered 257 to the customer at the quoted price.

By performing the above-described steps, the present invention is able to determine, based on indirect value of a customer, whether or not to offer a resource to a customer and at what price to do so, in order to optimize resource allocation and total revenue.

In an alternative embodiment, the above-described steps are performed in the context of implementing a marketing campaign, so that prospective customers are offered the resource if their indirect or total value exceeds a threshold value. In such an implementation, the above-described steps are initiated in the course of conducting a marketing campaign, rather than in response to a customer's request for a resource. Thus, for example, the above-described analysis might be performed for a set of potential customers, and direct-mail (or other) offers might be made to a subset of the customers, based on their indirect or total value. The offer prices may be tailored to each customer or customer segment, based upon indirect or total value and employing the same value-maximizing techniques described above.

Forecasting and Optimization Model

Revenue Management Product

In one embodiment, the present invention is implemented in conjunction with or as a component of a Revenue Management Product as is known in the art. Accordingly, the following description of preferred embodiments of the present invention discusses the invention in the context of such a product for revenue management in a casino/hotel operational context. The particular implementation discussed herein is merely illustrative, and the particular characteristics and operating schemes of the implementation are not intended to limit the scope of the claimed invention.

Conventional revenue management processes for casino/hotel operations attempt to forecast demand and optimize room prices at the revenue management product level. A revenue management product represents a hotel stay and thus has four primary attributes: arrival date, length of stay, room category, and customer segment. A bid price offered to a consumer may depend on any or all of the attributes of the hotel stay.

Arrival date: the date for which the forecast is made, typically the day the customer arrives at the hotel; also referred to as day zero.

Length of stay: the number of room nights the customer spends in the hotel.

Room category: one of any number of predefined room categories, or types. In one embodiment, five room categories are provided, denoted A (highest value) through E (lowest value), plus a sixth category, denoted F, to represent unmanaged rooms for which the system does not forecast demand nor provide inventory control.

In one embodiment, all rooms within a particular room category are considered equivalent. Rooms in different room categories are considered to be in distinct and separate inventories. As described below, demand is forecasted and optimized separately for each room category.

If desired, subgroups may be created within room categories, and incremental or intermediate prices may be established for the sub-groups. In this manner, the spread between quoted room prices for the sub-groups can be controlled, and upgrades from one room category to another can be selected based on sub-groups. Rooms within a sub-group are treated as a single inventory for purposes of the present invention.

Customer segment: In one embodiment, customer segments are defined in order to provide greater forecasting accuracy and to ensure that bid prices (i.e. room prices offered to customers) generated from the optimization process will maximize potential value. Customer segments may be defined based on any combination of factors, including for example demographic, psychographic, and behavioral observations and predictions. In one embodiment, 64 customer segments are defined.

Segments may be further defined according to whether the customer is incented or un-incented. Incented means the customer has been sent a special offer or invitation to a special event.

In one embodiment, an expected indirect value, such as gaming value, is associated with each customer segment. The gaming value can be determined, for example, based on statistical analysis of gaming behavior information collected from customers. The determined value may be continuous or in ranges. In one embodiment, there are six levels of nightly gaming value, including: $0–49; $50–99; $100–149; $150–199; $200–299; and $300+. In addition, the system may provide two levels for unknown status (based on estimates): $0–49; and $50–99. These ranges may be changed as desired, and may be specific to different properties. Those of skill in the art will see that more or fewer ranges may be used, and the range bounds may be changed as desired. A room price may be associated with each level of gaming value, if desired. In one embodiment, there are 12 room rate types, including Comp, Casino, General Reservations 1 through General Reservations 8.

A room price can be established for the customer segment based on the indirect value. A total value for a customer within the customer segment can be determined by adding the average nightly gaming value to the established room price.

For example, if it is determined that a customer segment having a nightly gaming value of $100–149, a room price of General, and a channel of incented has an average nightly gaming value of $132, the discounted room price may be set at $165, giving the segment a total value of $297. The method by which the room price is established will be described in more detail below.

Bid Prices

A bid price is a price at which the resource is offered to a customer. In one embodiment, the present invention tracks up to five types of bid prices: an initial bid price, a optimal bid price, a recommended bid price, a competitive intelligence (CI)-adjusted bid price, and a user-adjusted bid price.

Initial Bid Price. The initial bid price does not take into account the gaming value for the customer segment. The initial bid price is derived by well-known mechanisms for setting prices for resources such as hotel rooms, and may be based on demand, availability, promotional and market considerations, and the like.

Optimal Bid Price. The optimal bid price is a refinement of the initial bid price, and may be segmented according to subcategories such as inventory date and room category. The optimal bid price is the marginal value of the last room available for a particular inventory date and room category, as determined by techniques that are known in the art. In one embodiment, for each inventory date, a "cutoff" value is established to determine whether to accept or reject demand corresponding to different revenue management products.

Recommended Bid Price. The recommended bid price is the price at which the system recommends the resource be offered to the customer, excluding factors associated with the competitive environment. The recommended bid price is derived from either the initial bid price or the optimal bid price by taking into account indirect value, such as actual or expected gaming value, for the customer or customer segment. In one embodiment, the indirect value is discounted by a predefined percentage associated with the particular customer segment. This predefined percentage can be set as desired for each customer segment, based on external factors or user preferences. The discounted indirect value is subtracted from the optimal bid price to determine the recommended bid price. For bid prices that fall below a certain minimum, a predefined "comp" or "casin θ" price can be substituted.

For example, the optimal bid price for a particular inventory date and room category might be $225, while the actual or expected gaming value for a particular customer segment for that date might be $200. If a 50% discount is applied to the gaming value, a recommended bid price of $125 would be generated. This is calculated by taking the gaming value ($200) after the 50% discount ($100), and subtracting it from the optimal bid price ($225).

CI-Adjusted Bid Price. The CI-adjusted bid price is derived from the recommended bid price, and further takes into account the competitive environment. Competitive prices are provided to adjust the recommended bid price, when appropriate, to be in line with the competition and with market pressures. The CI-adjusted bid price may be activated or deactivated by the user, as desired, and may be the basis for the price at which the resource is offered.

In one embodiment, the CI-adjusted bid price is determined as follows. A set of competitive properties is determined, and a market composite rate is established based on the rates charged by the competitive properties. The difference between the recommended bid price and the market composite rate is then determined. The result is adjusted based upon a weighting factor, which may depend on the booking window for the requested reservation. If the CI-adjusted bid price is below a predefined minimum room price for a given customer segment, the bid price may be adjusted upward as necessary.

For example, if the weighting factor for a particular booking window is 75%, the recommended bid price will be adjusted by 75% of the difference between the recommended bid price and the market composite rate. If the recommended bid price is $175 and the market composite rate is $135, the CI-adjusted bid price would be adjusted downwards by ($175–$135)*0.75, or $30, resulting in a value of $145.

User-Adjusted Bid Price. Once a user has been presented with a recommended bid price or a CI-adjusted bid price, he or she may adjust the bid price if desired, or may override the recommendation altogether. In one embodiment, the present invention tracks user adjustments and takes such adjustments into account when generating bid prices, or when developing statistics for future analysis.

In one embodiment, a set of predefined prices is established, and the bid price generated by the invention serves as an indicator as to which of the predefined prices should be made available to a particular customer. For example, if a recommended bid price (or CI-adjusted bid price) of $89.52 is generated by the system, and the predefined room prices for the hotel include $75.00, $110.00, and $150.00, then the room may be offered to the customer at $110.00, representing the lowest predefined room price that exceeds the recommended bid price.

In one embodiment, if the recommended bid price exceeds all predefined prices, the system recommends that the resource be denied to that customer. Only a customer who has a high enough indirect value to reduce the bid price below at least one of the predefined prices is offered the resource. In an alternative embodiment, the system only recommends that a customer be denied a resource when there is enough demand at higher levels of indirect value to consume the resource.

Gaming Value Tracking

As discussed above, one example of indirect value that may be determined and employed in the context of the present invention is gaming value. Thus, in the context of a casino/hotel operation, customers who generate higher gaming revenue might be offered more favorable room rates.

In one embodiment, the gaming value may be provided as an actual value or an expected value. The value is determined based on actual or predicted gaming behavior by, for example, taking the average daily theoretical win and applying property-specific profitability margins depending on game type and player value ranges.

Expected gaming value (or predicted gaming value) is determined by statistical analysis of the customer's historical gaming behavior, taking into account factors such as the date and time of arrival, length of stay, previous behavioral trends, and the like. Information about the customer's historical gaming behavior is collected using player tracking technology, such as identification cards which are read by slot machines and other gaming machines and which automatically track and accumulate a player's betting patterns. For table-based games, manual tracking of player betting may be utilized, so long as such manually gathered information is accumulated and maintained in the appropriate databases for analysis. Suitable customer tracking technology is described in related U.S. Pat. No. 5,761,647, for "National Customer Recognition System and Method." Accordingly, the expected gaming value represents the expected value of the customer's gaming activity when they visit at the date specified in the reservation.

Actual gaming value represents the actual observed gaming activity for the dates defined by the reservation, and is thus measured after the fact.

In one embodiment, actual gaming value is provided to the system as an input to the system of the present invention after the customer has checked out of the hotel, and thus when it is too late to determine a bid price for that hotel stay. However, by taking into account actual gaming value, the invention is able to refine its estimates of estimated gaming value for the customer on future visits and thus more efficiently optimize revenues. In addition, actual gaming value may be used to refine estimates for the customer segment to which the customer belongs. In one embodiment, actual gaming value is used as input for the optimization process of the present invention, and is also discounted and used in a post-optimization process to determine optimal bid prices for customer segments. FIGS. 7–16 show an example of a customer valuation method for determining one type of indirect value, specifically a customer gaming value, which is also called a customer value.

Overall Operation

Referring now to FIG. 2A, there is shown a flowchart of the overall operation of a revenue management system employing the present invention in the context of a casino/hotel operation. FIG. 2A illustrates an example of how the techniques of the present invention can be employed in conjunction with demand forecasting and other known techniques, to provide bid price recommendations that optimize resource allocation and revenue management.

Daily demand data is extracted 201 based on bookings, cancellations, and denials. In one embodiment, each property runs a daily process to update values for all forecast statistics based on the most current day's activity. Updating is based on a smoothing technique, such as for example Kalman filters or any other similar technique known in the art. Kalman filters are similar to exponential smoothers, but the smoothing constant, or weight of new data, changes with time as the system weights average demand from the previous eight weeks more heavily than the most recent observation. Thus, the forecast tends to be more stable and does not react violently to new data points.

Forecasted demand data is aggregated 202 into customer segments. Based on the aggregated data, and taking into account special events and segment events, demand forecasts are generated 203 for each customer segment. Generated forecasts predict demand in terms of unconstrained arrivals, i.e. the total number of arrivals that would stay at the hotel if there were sufficient room for all. Deseasonalized arrivals demand is multiplied by a seasonal adjustment factor and, if necessary, by a revenue management event factor to take into account special circumstances and events. The resulting forecast predicts demand in terms of total arrivals for any given day in a year.

For each customer segment, as well as current hotel capacity and data describing room rates at competing local hotels, optimization 204 is performed, using the techniques described above in connection with FIG. 2B to generate bid prices that maximize total revenue and optimally allocate resources. For each customer segment, a recommended bid price is developed that takes into account the expected gaming value of customers in that segment. If desired, competitive pressures are also taken into account, as described above.

Optimization step 204 takes into account the remaining demand forecast and remaining available capacity, using techniques that are known in the art, in order to generate optimal bid prices by inventory date and room category. These bid prices are used by reservation agents to recommend room prices. In addition to generating recommended bid prices, the optimization step 204 generates overbooking recommendations based on forecasts of no-shows and cancellations. Overbooking recommendations are generated by inventory date and room category. Overbooking adjustments are added to the optimizable capacity, so as to define the availability of rooms for generating bid prices, according to techniques that are known in the art.

Once optimized bid prices are generated, the prices are filtered 205 to set appropriate prices. For example, prices may be rounded up or otherwise adjusted to match industry norms, according to techniques that are known in the art.

In one embodiment, filtering 205 is performed based on control segments determined by reference to average daily gaming values. Pricing and availability determinations may be made at the control segment level. For example, eight control segments, made up of 64 customer segments, might be established, according to the following table:

| Control segment | Segment Description |
| --- | --- |
| 1 | Nightly Gaming Value >= $300 |
| 2 | $200 <= Nightly Gaming Value < $300 |
| 3 | $150 <= Nightly Gaming Value < $200 |
| 4 | $100 <= Nightly Gaming Value < $150 |
| 5 | $50 <= Nightly Gaming Value < $100 |
| 6 | Nightly Gaming Value < $50 |
| 7 | Unknown customer with expected Nightly Gaming Value >= $50 |
| 8 | Unknown customer with expected Nightly Gaming Value < $50 |

Recommendations are generated 206 and output 207 for various rooms and customer segment combinations. These output recommendations take into account all of the above-mentioned factors, including room category, control segment, gaming value, and competitive information. In one embodiment, recommendations are provided in response to individual customer requests for rooms; in another embodiment, recommendations are provided in connection with a marketing campaign, so as to provide bid prices at which rooms are offered in the campaign.

Recommended bid prices thus take into account the gaming value of the customer, as well as other factors such as demand and availability. In one embodiment, a user (such as a booking agent) may override system recommendations when quoting room prices. As discussed above, overrides or modified forecasts are provided as supplemental inputs to the system, and may be taken into account when re-optimizing to generate new recommendations for future room quotes.

In one embodiment, when the user overrides the system's recommendation, he or she may initiate re-optimization (or such operation may occur automatically), which may in turn result in updates to bid price recommendations. In one embodiment, overrides are not persistent unless the user re-optimizes and uploads new recommendations.

In one embodiment, user overrides are limited, so that a user may over-ride a bid price recommendation only by replacing the recommended bid price with a "comp" or casino price that may be predefined for each particular property. Defaults may also be provided.

In one embodiment, overrides, whether default or manually applied by the user, are persistent. The identified override price remains as the recommended bid price for that property and customer segment, until otherwise changed.

System Components

In one embodiment, the present invention is implemented as a combination of computer-implemented systems and business processes. The computer system for implementation of the present invention may be, for example, a Unix-based computer such as available from Hewlett-Packard Corporation of Palo Alto, Calif. The system of the present invention includes several interrelated functional components. Each of these will be described in turn, in connection with a system for generating bid prices for a casino/hotel operation according to the present invention.

Figure 3:
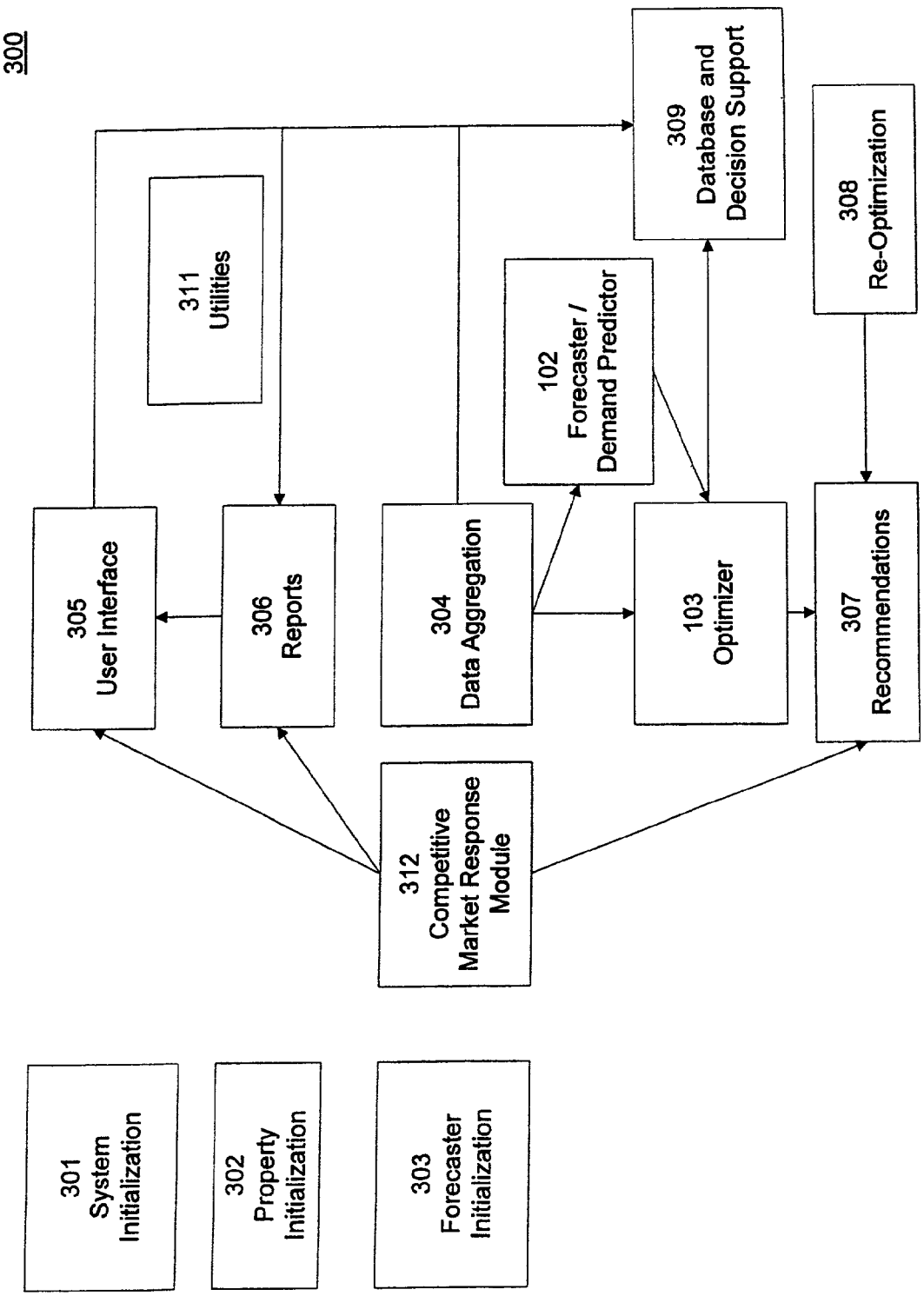
FIG. 3 is a block diagram showing system components of one embodiment of the invention.

Referring now to FIG. 3, there is shown a block diagram of functional components of system 300, according to one embodiment of the invention. Details of the operation of the various functional components are also provided below, in connection with the description of the user interface according to one embodiment of the invention.

System Initialization 301: Prepares file systems, creates the system data-base, and establishes the environment for system operation. Server platform is initialized and system code and databases for tracking hotel properties, bookings, gaming, customers, and the like are implemented, according to techniques that are known in the art.

Property Initialization 302: Prepares an individual property (hotel) for integration into the functionality of the system. Creates and configures a property database on the server platform that is ready to include in daily processing activity. In one embodiment, an initialization script is invoked to create the database, load historical data, and execute initializations, according to techniques that are known in the art.

Forecaster Initialization 303: Includes long-term initialization, which produces seasonality and other statistics for forecaster 102 and optimizer 103. These values are derived from analysis of historical demand patterns for each property. Default statistical values for forecasting are developed.

Also includes short-term initialization, which develops rolling average statistics used by forecaster 102, according to techniques that are known in the art. Simulates daily data aggregation and statistical update processing for a number of capture dates.

Data Aggregation 304: Loads daily reservations and status data for each property, and aggregates into buckets related to revenue management. This is accomplished by loading data extract files into a staging area, and calling data aggregation scripts to process the data into tables, according to techniques that are known in the art. Data aggregation 304 takes input from data capture, control curve, room type category detail, yield GNR transactions, price code, and lost business data. The results stored in database tables for use by forecaster 102, optimizer 103, and decision support tools 309.

User Interface 305: Facilitates user interaction with system 300 via screen displays, keyboard and mouse input interfaces, and the like.

Reports 306: Facilitates selecting scheduling, viewing, and printing output. Reports 306 are viewed, in one embodiment, through user interface 305 or through a web interface, as for example via an intranet.

Forecaster/Demand Predictor 102: Generates demand forecasts for each day in the forecast horizon, for each property, according to techniques that are known in the art. These forecasts are used by optimizer 102 and decision support tools 309. Forecaster 102 determines forecasts using transaction data, business statistics, daily arrival information, and the like. Data for forecaster 102 is generally aggregated by aggregator 304.

Optimizer 103: Maps projected demand from forecaster 102 to available inventory, and recommends optimal bid prices and overbooking levels by inventory date and room category. Bid prices are adjusted by gaming value to generate bid price recommendations for recommendations module 307, as described above. Performs mapping for each day in the forecast horizon.

Recommendations 307: Filters results of optimizer 103 to a level that can be controlled by the booking process, and generates bid prices and overbooking recommendations for each customer segment in each room category. In one embodiment, competitive market response module 312 determines a market composite price based on room prices charged by competing hotel properties, and recommendations 307 are automatically adjusted based on the market composite price to generate a CI-adjusted bid price, as described above.

In one embodiment, recommendations module 307 checks against current recommendations in the reservation environment to produce new recommendations only when the current recommendations differ from the optimal recommendations generated by optimizer 103. An action index scales recommendations by a sliding numeric scale, based on the revenue consequences of failure to accept the recommendations. The action index measures relative impact of a recommendation compared with the most revenue impacting inventory date. Thresholds may be defined, specifying when recommendations should not be sent, or should automatically be accepted ("auto-piloted"), or should be recommended for review. Recommendations module 307 further processes overbooking and bid price recommendations, as well as reservation requests based on gaming value and other customer segment factors.

In one embodiment, recommendations may be automatically transmitted, or held for manual review by a user, or both, as desired. Automatic transmission can be effected as part of a periodic batch process, for example on a daily basis. Alternatively, recommendations may be transmitted in response to users flagging generated recommendations and/or building transaction updates via user interface 305. Received recommendations can be integrated into reservation booking systems so that future bookings automatically take into account the recommended bid prices and overbooking levels.

In one embodiment, recommendation files are divided by property, for improved distribution of transaction load. One example of the file format that is generated by the present invention contains records with the following fields:

| Field Name | Description |
| --- | --- |
| Recommendation ID | Unique identifier for the recommendation |
| Hotel ID | Unique identifier for the hotel or property |
| Arrival Date | Day of arrival for the data in this record |
| Customer Segment | Unique identifier for the customer segment |
| Room Type Category | Unique identifier for the room type category |
| Bid Price | Recommended bid price for this arrival date, room type category, and customer segment |
| Breakpoint | Recommended breakpoint for this arrival date, room type category, and customer segment |
| Recommended Overbooking Level | Recommended overbooking level for this arrival date, room type category, and customer segment |

Recommendation files, once received, are processed by the receiving system. Once processing is complete, a recommendations result file may be transmitted back to recommendations module 307, containing the original recommendation record identifier plus an indicator of the status of the recommendation (success or error). The result may optionally contain error text, if applicable. An example of the format for the result file is as follows:

| Field Name | Description |
| --- | --- |
| Recommendation ID | Unique identifier for the recommendation |
| Recommendation Type | Type of recommendation: bid price, or overbooking |
| Response Code | 0 = success; 1 = failure |
| Response Message Text | Error message stating reason for failure, if applicable |

Re-Optimization 308: Provides functionality for re-optimizing overbooking and bid prices after changing forecasts. The user can override the forecasted demand and re-optimize overbooking and bid price recommendations for the room category in question.

Re-optimization 308 is initiated when the user overrides the forecast for one or more recommendations and/or manually triggers a re-optimization. In response, re-optimization is performed to generate new overbooking and bid prices, which are then provided to the user for review.

Database and Decision Support 309: Maintains aggregated daily demand data, forecasts and supporting statistics, and optimization results, for use in reporting and other decision support functions, according to techniques that are known in the art.

Database 309 acts as a data store for revenue management data (property databases) and system information, and may be implemented using any commercially available database. Database 309 provides structures and processes for transforming transaction data into revenue management data, and provides input to and stores output of forecaster/demand predictor 102 and optimizer 103 modules. Database 309 also provides a consistent data set for reports module 306, and may be a data source for third-party reporting tools.

Database 309 is used by aggregation module 304 to store aggregated data. Forecaster 102 reads aggregated data from database 309 and stores statistics in database 309. Optimizer 103 reads statistics from database 309 and stores recommendations in database 309. Database 309 also stores defined parameters and overrides received from user interface 305, and provides data for reports 306. A purge process (which may be included in utilities 311) may be provided to delete or archive historical data older than a specified amount of time, from database 309.

Utilities 311: Performs various system utilities, such as task generation and report generation. For example, a task scheduler executes a sequence of batch jobs in a Unix server environment, including data aggregation, forecasting, optimization, and reporting activities, of various modules of system 300. On-demand jobs such as user reports may also be managed through the task scheduler. Daily, weekly, or monthly jobs may be specified and executed.

A report generator provides functionality for query and display of data in tabular form. Data for the reports may be extracted from database 309, as specified by the user. Query criteria may be customized and saved for future use, as is known in the art of report generation. Reports may be scheduled to run on a periodic basis, or executed on demand. Predefined report types may be provided, and customization functions available for the predefined report types.

Competitive Market Response Module 312: In one embodiment, as described above, the present invention develops a CI-adjusted bid price, which takes into account competitive market information. Functionality for developing the CI-adjusted bid price may be included in recommendations module 307, or may be provided in a separate Competitive Market Response (CMR) module 312.

The competitive market response functionality of the present invention allows a user to enter data describing competitive room prices, which may be obtained from published advertising or by inquiring at competing hotels. Data from targeted competitors is weighted to determine a market composite price reflecting overall market conditions for a particular type of room. CMR module 312 adjusts recommended bid prices according to the determined market composite price.

In one embodiment, CMR module 312 operates as follows. User interface 305 includes a screen for establishing a number of targeted competitors, along with assigned weights for each. The market composite price is determined by weighted average among the applicable room prices of the targeted competitors.

User interface 305 includes a second screen for inputting competing prices. A user may call competing properties and/or enter prices from published ads or listings. This screen may also be used for viewing and editing previously entered prices. Alternatively, a data extract procedure may be implemented which facilitates the input of competing prices by an automated process, such as from online sources.

After optimizer 103 determines optimal bid prices, CMR module 312 makes adjustments based on the variance between the determined bid price and the market composite price. A market influence parameter may be established, to specify how strongly the variance affects the recommended bid price. In one embodiment, the percentage change resulting from the application of CMR module 312 is similarly applied to other room categories, so as to keep other room categories priced appropriately within the competitive environment. CMR module 312 may be implemented so as to automatically adjust prices, or to prompt the user before adjustments are made. If desired, adjustment recommendations can be displayed even when they are not adopted.

In one embodiment, CMR module 312 and user interface 305 implement additional functionality related to competitive prices. For example, UI screens may be provided for price comparison impact data, displaying changes in quoted prices and market composite prices. Denial data is also displayed, so that the user can infer changes in demand caused by fluctuations in market composite prices. For example, a first graph may show room price information, including composite price, quoted price, initial bid price, CI-adjusted bid price, and recommended bid price. A second graph may show denial statistics, including rooms sold, denials, and regrets. Both graphs may be displayed along a time axis showing days in the planning horizon. Thus, the user is able to identify increases in denials, decreases in rooms sold, and data showing whether these changes are caused by changes in market composite prices. Adjustments can then be made based on the displayed data. Reports containing this information may also be generated.

In one embodiment, a market influence screen may also be provided as part of user interface 305 in conjunction with CMR module 312. The market influence screen enables a user to specify and maintain parameters for automated adjustment of bid prices and/or room prices in response to significant variance between the market composite price and quoted prices. The user specifies market influence factors to determine the level of response to variances. Factors range from 0% to 100%, and are multiplied by the measured variance to determine the automatic adjustment to bid prices and room prices. Separate factors may be specified for different days of the week, time periods, or other subdivisions. In one embodiment, variance is measured for one room category, such as the lowest-value room category; in other embodiments more than one room category may be monitored. The present invention adjusts bid prices and room prices by the variance from market composite price, multiplied by the appropriate influence factor, to obtain adjusted bid prices and room prices.

In addition, a competitor price report, and other reports, may be generated and output by reports module 306, based on data from CMR module 312.

User Interface

In one embodiment, the present invention is implemented as functionality in a computer system for revenue management, according to techniques that are known in the art. User interface 305 facilitates user access to the features and benefits of the invention, and in particular provides means for input and access to stored and generated data related to hotel revenue management functions. The following description of several screens included in user interface 305 is merely exemplary; one skilled in the art will recognize that many other designs or types of screens may be provided without departing from the invention as claimed.

Recommendations Review Screen

Figure 4:
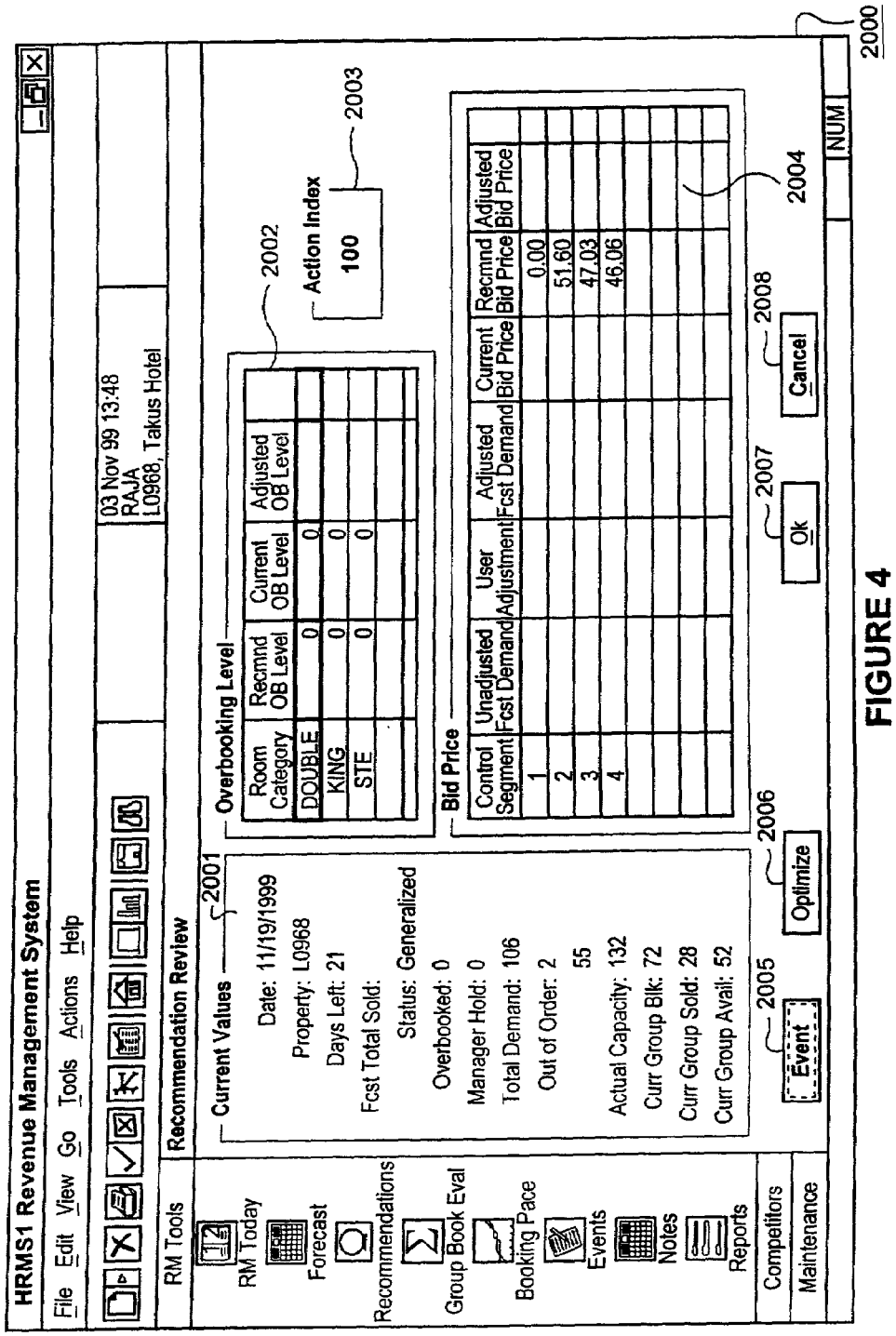
FIG. 4 is a screen shot of a recommendations review screen for a user interface according to the present invention.

Referring now to FIG. 4, there is shown a screen shot of a recommendations review screen 2000. Screen 2000 provides functionality for reviewing and modifying initial bid price and overbooking recommendations. Current values 2001 are displayed, including the date, property, days left, forecast total sold, status, overbooked quantity, manager hold, total demand, out-of-order rooms, actual capacity, current group block, current group sold, and current group available.

Table 2002 shows overbooking levels for each room category, including recommended levels, current levels, and adjusted levels. Additional fields as displayed in one embodiment include current sold, forecasted sold, forecasted no-shows, capacity, and remaining sold forecast. Action index 2003 is also displayed, as described above. Table 2004 shows, for a number of customer segments, the unadjusted forecast demand, user adjustment, adjusted forecast demand, initial bid price, recommended bid price, and adjusted bid price.

When the user chooses to adjust the forecasted demand or bid price, he or she right-clicks on the targeted recommendation. A pop-up screen, shown in FIG. 5, facilitates entry of modified forecast or bid price. Event button 2005 allows access to event information. Optimize button 2006 initiates re-optimization based on the newly modified information. OK button 2007 enters all changes and dismisses screen 2000. Cancel button 2008 dismisses screen 2000 without entering changes.

Adjust Bid Price Screen

Figure 5:
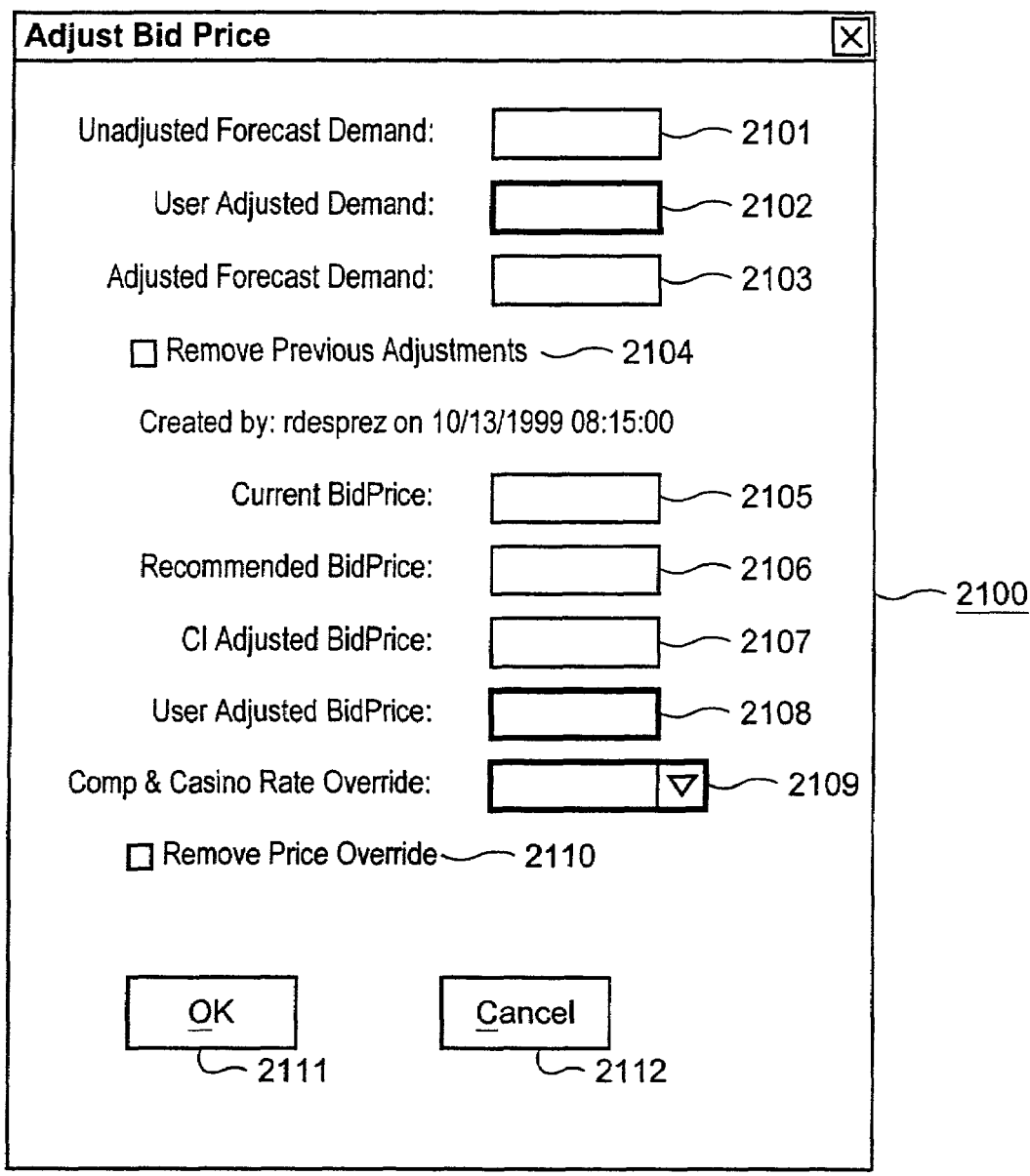
FIG. 5 is a screen shot of an adjust bid price screen for a user interface according to the present invention.

Referring now to FIG. 5, there is shown a screen shot of an adjust bid price screen 2100. Screen 2100 provides functionality for adjusting forecasted demand or bid prices. The user is able to review previously adjusted bid prices or adjusted forecast demand, and disable previous adjustments if desired.

In one embodiment, screen 2100 is presented when the user right-clicks on a targeted recommendation in screen 2000, or when the user selects an appropriate command from the main screen. In one embodiment, screen 2100 also includes a description of the day of week, room category, and customer segment that apply to the bid price being modified. Screen 2100 contains fields for unadjusted forecast demand 2101, user-adjusted demand 2102 (modifiable), adjusted forecast demand 2103, initial bid price 2105, recommended bid price 2106, CI-adjusted bid price 2107, user-adjusted bid price 2108 (modifiable), and "comp" and casino price override 2109. Checkboxes for removing previous adjustments 2104 and removing price overrides 2110 are also provided. OK button 2111 accepts the user's changes and dismisses screen 2100. Cancel button 2112 dismisses screen 2100 without accepting changes.

One skilled in the art will recognize that many other screens may be provided in connection with the present invention.

Reports

The system generates various types of reports, as are known in the prior art and as improved by the present invention, based on stored and generated data, including forecasts, optimizations, recommendations, booking data, and the like. Reports may be generated in response to user requests, or they may be automatically generated at specified times.

In general, reports generated by the present invention can be viewed on a user's workstation or monitor, or printed, or exported onto magnetic media, or transmitted across a network, according to techniques that are known in the art. In particular, users can view reports through user interface 305 or using a browser via a network such as an intranet.

The invention advantageously provides gaming reports which provide users with useful information related to gaming value.

Casino Block Analysis Report: A comparison of group and casino bookings with respective blocks defined. Shows transient actual sold, forecast transient demand, and recommended optimal sold.

Competitor Price Report: A listing of competitors' prices, along with respective weights.

Historic Revenue/Yield Report: A summary of yield and revenue performance for both room prices and gaming value.

Network Configuration

Figure 6:
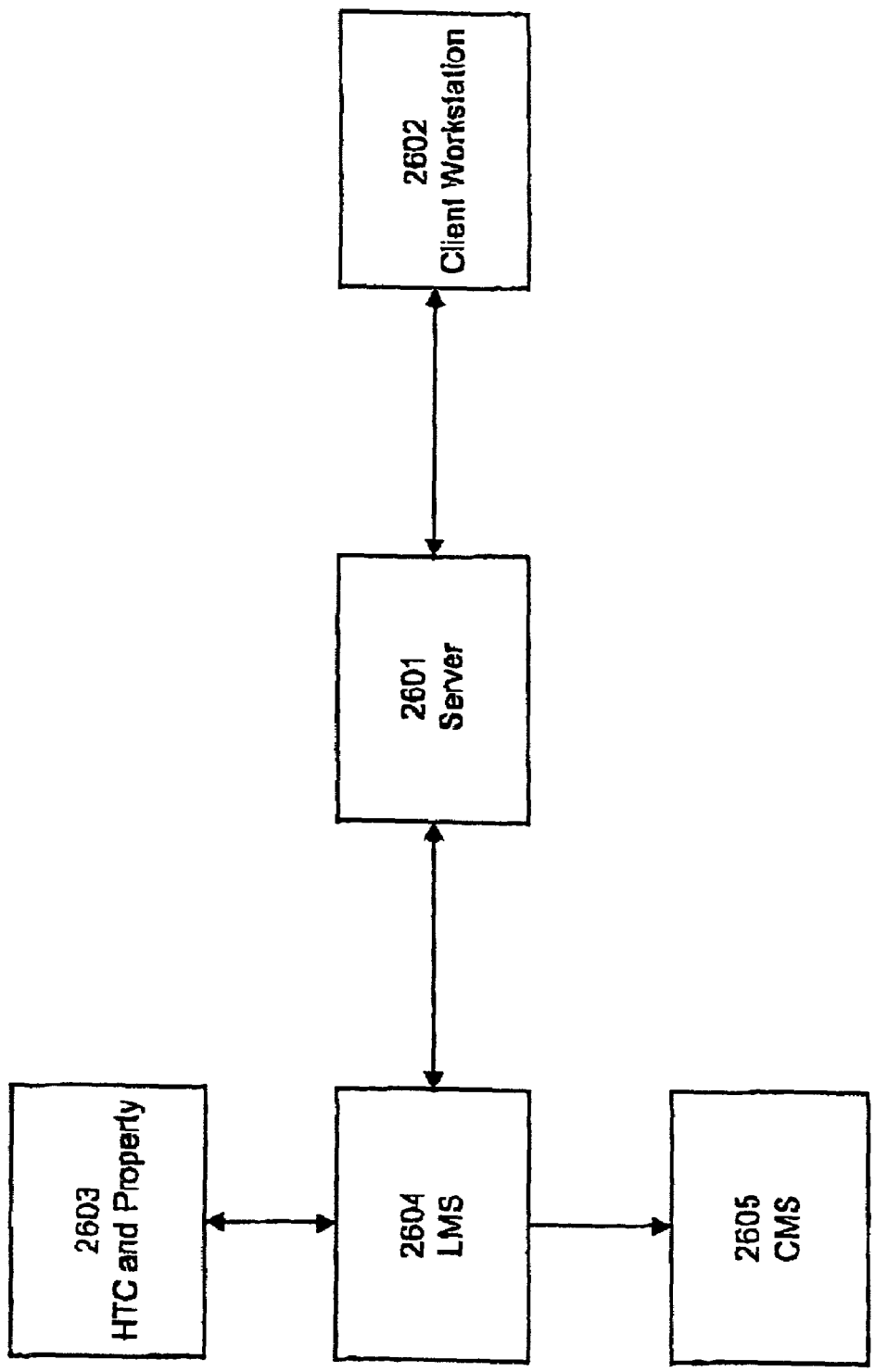
FIG. 6 is a block diagram of a network configuration for implementing the present invention.

Referring now to FIG. 6, there is shown a block diagram of a network 2600 configuration useful for implementing an embodiment of the present invention. In one embodiment, the present invention is implemented on a client/server architecture including a database and application server 2601, which acts as a central repository and which generates the forecast and optimization data and processes. Users access the data in the system via workstations 2602 connected over a network. Individual users may have different access rights and privileges, which are set and controlled via user accounts and security groups, as is known in the art. Users may be hotel employees, or even individual customers themselves, accessing the server 2601 via the Internet to obtain room reservations.

Lodging Management System (LMS) 2604 connects to server 2601 and supplies data used by the various functional modules of the present invention. Inventory control recommendations generated by the invention are transmitted to LMS 2604 and applied to LMS inventory counts.

LMS 2604 also receives data from a telephone center and properties 2603, and communicates with Casino Management System (CMS) 2605. The operation of these components is described in related U.S. Pat. No. 5,761,647, for "National Customer Recognition System and Method."

User interface functionality, including viewing reports, accepting and rejecting recommendations, and system maintenance, is accomplished via various ones of the client workstations 2602. Communications with server 2601 is facilitated by conventional network protocols and hardware. In one embodiment, client access via workstations 2602 operates via a browser interface over a network such as an intranet.

Customer Valuation

As discussed above, one example of indirect value that may be determined and employed in the context of the present invention is customer gaming value, also called customer value. In the context of a casino/hotel operation, customers who generate higher gaming revenue might be offered more favorable room rates. Alternately, customers who generate higher gaming revenue might be offered more or higher valued complimentary (comp) items.

In one embodiment, the customer value may be provided as an expected value or an actual value. The value is determined based on actual or predicted gaming behavior by, for example, taking the average theoretical win (TW) and applying property-specific profitability margins depending on, for example, game type and player value ranges. In one embodiment, the average theoretical win is determined on a property-specific basis. In other words, the same customer gaming behavior will not necessarily result in the same theoretical win if valued for two different casinos (properties). Similarly, at a given property, theoretical wins are computed separately for each gaming type. Thus, a customer's losing $200 to slot machines may be valued differently than the customer's losing $200 to a table game such as Blackjack because of the costs and overhead associated with the different gaming types. FIGS. 7–16 show an example of a customer valuation method and system for determining one type of indirect value, specifically a customer gaming value, which is also called a customer value.

FIG. 7(*a*) is a flow chart showing a relationship between an embodiment of the present customer evaluation method and a resource management system, such as that shown in FIGS. 1–6. In the described embodiment, a customer value is determined for a customer across a brand using a property-specific analysis. When valuing a potential hotel/casino customer, for example, this means that a customer value is determined for the customer at the individual casino or hotel in which the customer is interested, but the customer value is determined using information from the customer's activities at one or more other casinos and hotels in the system, if such information is available. Thus, for example if the customer is interested in a hotel in Las Vegas, but has previously stayed or gambled at other affiliated hotels in another city, then information from the other hotels also may be used to determine a customer valuation specific to the hotel in Las Vegas.

Figure 7A:
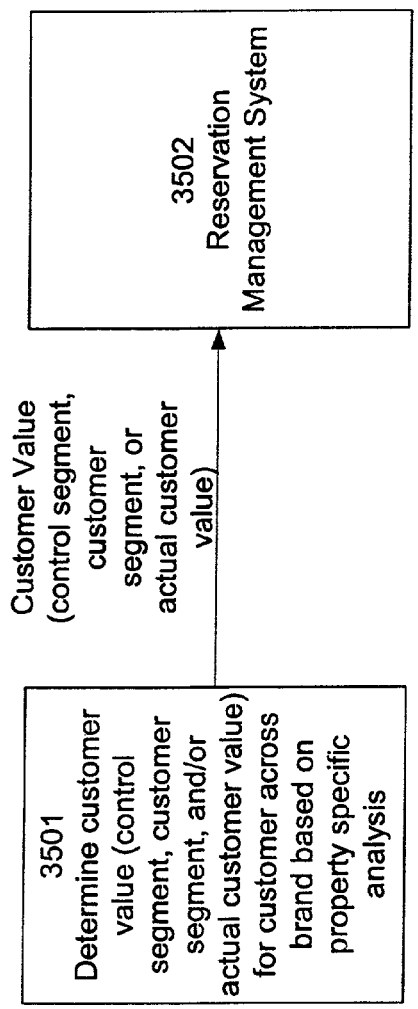
FIG. 7(*a*) is a flow chart showing a relationship between an embodiment of the present customer evaluation method and system and a resource management system, such as that shown in FIGS. 1–6.

In the example of FIG. 7(a), the customer valuation system 3501 is capable of determining a control segment for the customer (one of 10 possible control segments in the example). The reservation management system 3502 uses the control segment as described above in connection with FIGS. 1–6 to determine a price range at which to offer the customer a room. In the example, the customer valuation system also is capable of determining a customer segment within the control segment for the customer (one of 64 possible customer segments in this example). The reservation management system uses the customer segment to rate the customer within his assigned control segment at the time of booking.

Figure 7B:
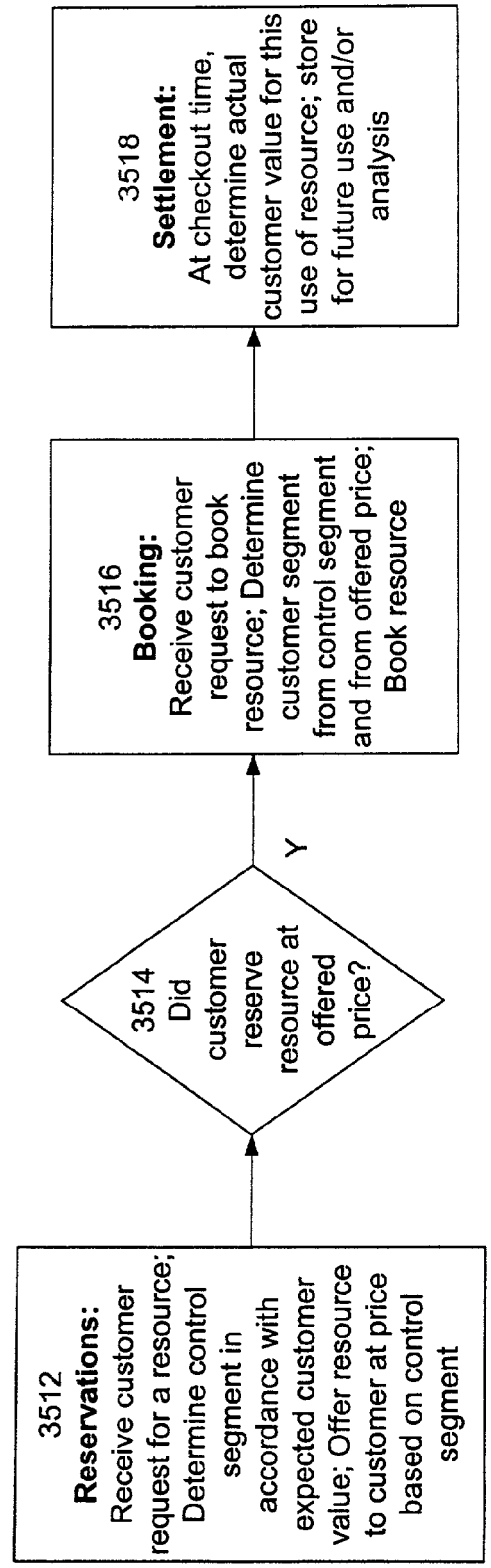

FIG. 7(b) is a flow chart of three contexts in which a customer valuation method might be used in a hotel/casino system: Reservations, Booking, and Settlement (checkout). During the reservations operation 3512, the system receives a request to book or reserve a resource, such as a hotel room at a specific property for one or more customers. The system determines a control segment for the customer for the specific property requested. The same customer may be assigned different control segments for different properties, depending on his past activities. As described in further detail below, the control segment for the customer at this property is determined in accordance previously saved data across multiple affiliated hotels. Thus, for example, if a customer requests a room in Las Vegas, but has stayed at affiliated hotels in the same chain in another city, the customer's actions in those cities will be used to determine his value in Las Vegas. These same previous actions may result in different control segments for different hotels. For example, if the customer usually plays the slot machines and there are no slots at a particular hotel, his value may be lower at that hotel, than in hotels that have slots machines. In the example, there are 10 possible control segments, representing different values of customers. Customers with a higher potential value will receive more favorable room rates from the reservation system.

If the customer chooses to reserve a room at the offered price 3514, then the room is booked 3516, and the customer valuation system determines a customer segment within the customer's control segment. This customer segment is used to further categorize customers within a control segment.

Once the customer has settled (checked out) 3518, the customer valuation process preferably is invoked again to determine an actual value for the customer, based on his actions during his stay.

The following paragraphs describe an embodiment of a method to determine a customer profitability value. It will be understood that other implementations of the present invention can be made. FIGS. 8–12 show table data structures used in the described embodiment. Other embodiments may use different data structures or similar data structures with different and/or additional fields. In the described embodiment, each table data structure in FIGS. 8–12 includes a Property ID key (Prop ID), which identifies the customer for which the profitability determination is being made.

FIG. 8 shows a data structure 3532 used by the customer valuation method and containing property-specific flags and values. The Hotel_Only flag value reflects whether only data for hotel stays should be used to compute a customer's theoretical win. If only hotel data is used, most customers will end up with a higher theoretical win, since it is common for a customer staying at a hotel to spend more time gambling and thus to spend more money. The Min_Hotel_Trips_Required field indicates how many hotel trips the customer must have made before only hotel data will be considered. Even if the Hotel_Only flag is true, hotel only data will not be used if the customer has not made the minimum number of trips.

The Property's_Default_Theoretical_Win (TW) field contains a default TW value that will be used for unknown/unrated customers at this property. If a customer has not stayed in this or other hotels in the chain, then the default TW will be used. As described below, this value may be modified further in certain embodiments if the customer played slot machines during his stay and/or if multiple guests are staying in the room.

The Unknown_Guest-Multiplier field contains a multiplier to use if more than one guest will be staying in the room. For example, if the property's default TW for unknown guests is $20, and the unknown guest multiplier for that property is 1.5, then two guests in a room for that property would be given a default TW of $30.

The Default ADR field is the Average Daily Rate that the customer would pay at this property. This value is saved and used in later analysis, particularly if a customer chooses to turn down the quoted room price, since information on the average value of rooms turned down is also interesting in determining future room prices.

FIG. 9 shows a data structure 3534 used by the customer valuation method and containing values associated with a source code for the customer. The Source Code field contains a code indicating possible sources of an unknown customer, such as special promotions, etc. The source code could also indicate the unknown customer's home address. For example, if Californians are known to spend more money in Las Vegas than Minnesotans, unknown customers with a source code indicating that they are from California may receive a higher valuation than those with a source code indicating Minnesota when the requested room is in Las Vegas. This situation may be reversed in a hotel in Minnesota if data shows that Minnesotans spend more in their home state.

There may be more than one Source Code per property. Each Source Codes has a corresponding Source Code's Default TW field, which contains a Default TW to use if the unknown customer came from that source. The Default TW field preferably contains a different value than the Property's Default TW of FIG. 8. For example, a customer is given the Property's Default TW of $30 unless the customer is from source BD, in which case the customer would receive a Default TW of the Source Code's TW of $40.

FIG. 10 shows a data structure 3536 used by the customer valuation method and containing values associated with a daily profit determination for the customer. Here, the Minimum and Maximum Daily TW fields form a range of TWs. Each daily profit determination table contains multiples ranges, and each range contains multiple Game Type fields, such as Table, Slots, and Other. Within each range, each gaming type has a corresponding weighting factor, representing the profit percentage for the game type and TW range.

FIG. 11 shows a data structure 3538 used by the customer valuation method and containing values associated with a nightly profit determination. If a customer stays overnight at a hotel, experience shows that the customer will actually spend more than one day in the casino. Thus, if a customer's stay includes a night time stay, his TW is increased by a predetermined factor. Experience has also shown that the more nights a customer stays, the less additional dollars per day he will spend. Thus, the customer valuation method determines an additional factor based on the number of nights a customer has stayed at a hotel. Here, the Minimum and Maximum Daily Adjusted Daily Revenue fields form a range of minimum adjusted daily revenues. Each nightly profit determination table contains multiples ranges, and each range contains multiple Number of Nights Reserved values, such as 1, 2, 3, etc. Within each range, each the number of nights reserved value has a corresponding weighting factor, representing the percentage that TW should be increased for that number of nights and range for this property. Thus, if a customer has a minimum adjusted daily revenue of $30 and has stayed one night, his revenue will be higher by the factor. In the described embodiment, customers who stay 4 nights or more receive a factor of "1," since it is believed that longer staying customers stop spending more money as their length of stay increases.

Other embodiments, based on a revenue model for certain properties or industries will use the factor to lower the adjusted daily revenue, instead of to raise it. Other embodiments may use the factor to either raise or lower the revenue.

FIG. 12 shows a data structure 3539 used by the customer valuation method and containing values associated with control segments and customer segments. The control segment field is the field whose value is returned to the reservation operation. The customer segment is returned to the booking operation. Here, the Minimum and Maximum Nightly Profit fields form a range of nightly profits. Each nightly profit determination table contains a range for each property and a range of actual maximum and minimum room rates for each segment, for both known and unknown customers. The table further contains a Rate Descriptor field indicating the range of room rates should be given to various types of customer. For example, a "comp" value indicates that this is the room rate range for a comped customer. A "C1" value indicates that this is the room rate range at a high priced casino hotel.

FIG. 13(a) is a flow chart showing an overview 3540 of the customer valuation method used with a reservation operation. Once a request for a resource at a specific property for a specific customer is received 3542, the system determines a theoretical win (TW) 3544 for that customer based on the customer's past actions at this and other properties in the chain. This TW value is based on past activities of the customer and can vary for different requested properties. If the guest has an incentive to book the room (such as a coupon), his incented flag is set 3546. Expected total daily profits are determined for this customer at this hotel, based on his past actions across the chain 3547. If the customer has stayed overnight in the past, his expected total daily profits are adjusted by a factor depending on the number of nights he has stayed in the past 3548, since overnight stays are assumed to be more profitable in this embodiment. Finally, based on the determined information, the system determines a control segment for this guest at this property.

It will be understood that the above method is an example only and should not be taken in a limiting sense. For example, other embodiments of the invention might add or omit steps or might change the order of steps. As a further example, the incented flag may not be used in other embodiments. Similarly, the nightly profit determination might not be used in other embodiments.

FIG. 13(b) is a flow chart showing an overview of the customer valuation method 3552 used with a booking operation. In the described embodiment, the customer valuation system uses information, such as the control segment and the accepted room rate, determined during the reservation process, to determine a customer segment within the previously determined control segment 3554.

FIGS. 14(a)–14(c) are flow charts showing details of the customer valuation method used with a reservation system. In the described embodiment, the inputs 3562 to the customer valuation process during reservations are: an ID for the requested property (e.g., Las Vegas); a customer source code; a customer offer code; a number of nights requested to be reserved; a number of extra adult customers; and a flag indicating whether this customer is a previously known customer who has stayed at least one hotel or casino in the chain associated with this brand of hotels/casinos.

FIG. 14(a) shows a method to determine a TW for the specific customer and property specified. If there are no previously saved data for this customer 3564, then the customer is an unknown customer and the system will use one of the default TW value specific to the requested property, as shown in the tables of FIGS. 8 and 9. If there is a source code for the customer 3566, the default TW for that source code is used 3568 (see FIG. 9). If there is no source code for the customer 3566, the default TW for the property is used 3570 (see FIG. 8). In either case, control passes to step 3582 of FIG. 14(b).

Table 2 shows an example of the data structure of FIG. 8 populated with example data. The columns of Table 2 correspond to those of FIG. 8. The data shown in Table 2 is all for the same property ID (ID=104). It will be understood that a complete data structure would have data for each property in the chain of properties, so that the method of FIGS. 14–15 could be performed for any property in that chain.

If the customer is known 3564, then the system determine whether the customer has stayed at enough hotels that a "hotel only" adjustment needs to be made. If the hotel only flag (not shown) for this customer is true and the customer has stayed at a hotel for at least a specified minimum number of trips 3572, then just information from hotel stays is used to determine the customer's TW 3576. As discussed above, experience has shown that using hotel only data will result in a higher TW since hotel stays usually result in higher gambling proceeds that day trips to casinos. For example, if a customer lives in Joliet and regularly gambles during day trips to Joliet casinos, but twice a year goes to Las Vegas, stays in hotels, and gambles, it is assumed that using only data from his hotel stays will result in a higher and more accurate TW for other hotel stays than would result if the day trips to Joliet were also considered. After the TW is determined in this case, control passes to step 3582 of FIG. 14(b).

Similarly, if there are data for this customer, but all data is hotel data 3574, the customer's TW is determined based on just hotel gaming data 3576.

Certain embodiments may set the hotel only flag to true for all customers, resulting in the analysis described above. Other embodiments may always set the hotel only flag to false, or may not include a hotel only flag, resulting in skipping the above analysis.

If the hotel only flag is false and (or true, but not enough trips have been taken) and there is data from previous trips

3579, the data from all the customer's past trips to various hotels in the chain are used to determine the customer's TW for the specific property requested.

The actual TW calculation is known to persons of ordinary skill in the art, although in the described embodiment, the TW is calculated using the customer's activities from multiple affiliated hotels/casinos, not just from the property requested.

FIG. 14(*b*) shows a method for determining a value of an incented flag for the customer within the customer valuation system. If the offer code for the customer (not shown) is blank 3582, then the incented flag for the customer is set to false 3586. Otherwise, the incented flag is set to true 3584. In either case, control passes to step 3588.

FIG. 14(*b*) also shows a method for determining an expected total daily profit for the customer (or an actual daily profit if the valuation process is invoked during the settlement operation). If no default TW was used 3588, then there is previous data for this customer. In the described embodiment, the expected average daily profit is determined as follows:

For each hotel or casino for which we have data for this customer:
For each gaming type at that hotel/casino:
Use the greater of 100% of the daily average TW for all guests at this location and gaming type OR 40A % of the actual average TW for this customer to determine daily profit.
Look up the daily profit factor for each gaming type and property ID (see FIG. 10).
Multiply each daily profit by the daily profit factor by gaming type to get the adjusted daily profit factor per gaming type.
Sum the adjusted daily profit by gaming type to get the total daily profit for this customer at this hotel/casino Table 3 shows an example of the data structure of FIG. 10 populated with example data. The columns of Table 3 correspond to those of FIG. 10. The data shown in Table 3 is all for the same property ID (ID=104). It will be understood that a complete data structure would have data for each property in the chain of properties, so that the methods of FIGS. 14–15 could be performed for any property in the chain.

If a default TW was used 3588, and the number of extra adult customers is greater than zero 3592, the TW is adjusted by an unknown customer multiplier 3594 (See FIG. 8). Experience has shown that multiple customers spend more money than single customers. Therefore, if there is more than one customer, the TW is increased. In certain embodiments, a multiple is only used if there are more than a predetermined number of additional customers. In certain embodiments, different multiples exist for different numbers of additional customers.

If a default TW was used 3588, the default TW is adjusted if the customer has previously spent time playing slot machines 3596/3598. Because slot machines are generally less profitable than other types of machines, if the customer's previous play has involved mostly slots, then the default TW is adjusted downward. In alternate embodiments, the default TW is adjusted upwards if the customer played mostly non-slot machine types of games. After step 3598, the system has determined the total daily profits for the customer. When the determination is performed during the reservations operation, the expected daily profits have been determined. During the settlement operation, a similar method is used to determine the actual daily profits for the customer's current stay.

In FIG. 14(*c*), the daily profits are adjusted if the customer has stayed overnight in the past. Because overnight trips are more profitable than day trips, the daily profits value is adjusted upwards as described if the customer has stayed overnight in the past.

If the customer is known and data from all his trips is being used 3602, the average daily profit is adjusted in accordance with a nightly profit factor and number of nights reserved. The system looks up the nightly profit factor (see FIG. 11) and multiplies the daily profit by the nightly profit factor to determine the nightly profit. This nightly profit is either an expected nightly profit or an actual nightly profit, depending on the point in the reservation process that the customer valuation system is being invoked. If the customer is not known, no adjustment is performed, and the daily profits are used as the nightly profits 3608.

Table 4 shows an example of the data structure of FIG. 11 populated with example data. The columns of Table 4 correspond to those of FIG. 11. The data shown in Table 1 is all for the same property ID (ID=104). It will be understood that a complete data structure would have data for each property in the chain of properties, so that the methods of FIGS. 14–15 could be performed for any property in the chain.

Once the nightly profits (expected or actual) are determined, the customer valuation system looks up a control segment in the data structure of FIG. 12. Using the known customer flag, the expected nightly profit, and the incented flag, in that order of importance, the system looks up the control segment for the current customer 3612. If no match is found 3614, an error has occurred. The described embodiment handles the error by using the closest row in the data structure where the known customer flag is the same for the control segment. In the described embodiment, the expected nightly profit, control segment, and the incented flag are returned to the reservation operation 3618.

Table 1 shows an example of the data structure of FIG. 12 populated with example data. The columns of Table 1 correspond to those of FIG. 12. The data shown in Table 1 is all for the same property ID (ID=104). It will be understood that a complete data structure would have data for each property in the chain of properties, so that the methods of FIGS. 14–15 could be performed for any property in the chain. It should be noted that the same information about a customer's previous actions can cause the customer to be categorized into different control segments and/or different customer segments for different properties. Thus, the same known flag, nightly profit range, incented flag value, actual room cost range, could result in different control segments and/or customer segments for different hotels. The customer segment is determined on a property-specific basis, based on data for the current customer across the chain of properties.

A preferred embodiment uses 10 control segments (e.g., 0–9). Other embodiments could use some other number of control segments.

FIG. 15 is a flow chart showing details of the customer valuation method used with a booking system to determine a customer segment within a control segment. In the described embodiment, the customer valuation method receives the previously determined control segment, the known customer flag, the nightly profit, the incented flag, the rate description for the room rate accepted by the customer, and the average daily expected room cost 3622. The system uses these input values to look up the customer segment in the data structure of FIG. 12. This rate descriptor can have values representing casino/hotel rates (e.g., CP1, CP2) 3524 or can have values representing comped rates 2638. If an error occurs and no match in found in the data structure, the system uses the closest row within the specified control segment where the known customer flag in the data structure matches the input known customer flag and the nightly profits are within the minimum/maximum range. The order of importance for matching the remaining fields preferably in incented flag, rate description, and room range cost.

A preferred embodiment uses 64 customer segments (e.g., 1–64). Other embodiments could use some other number of customer segments, or could distribute them unevenly between the control segments.

Figure 16:
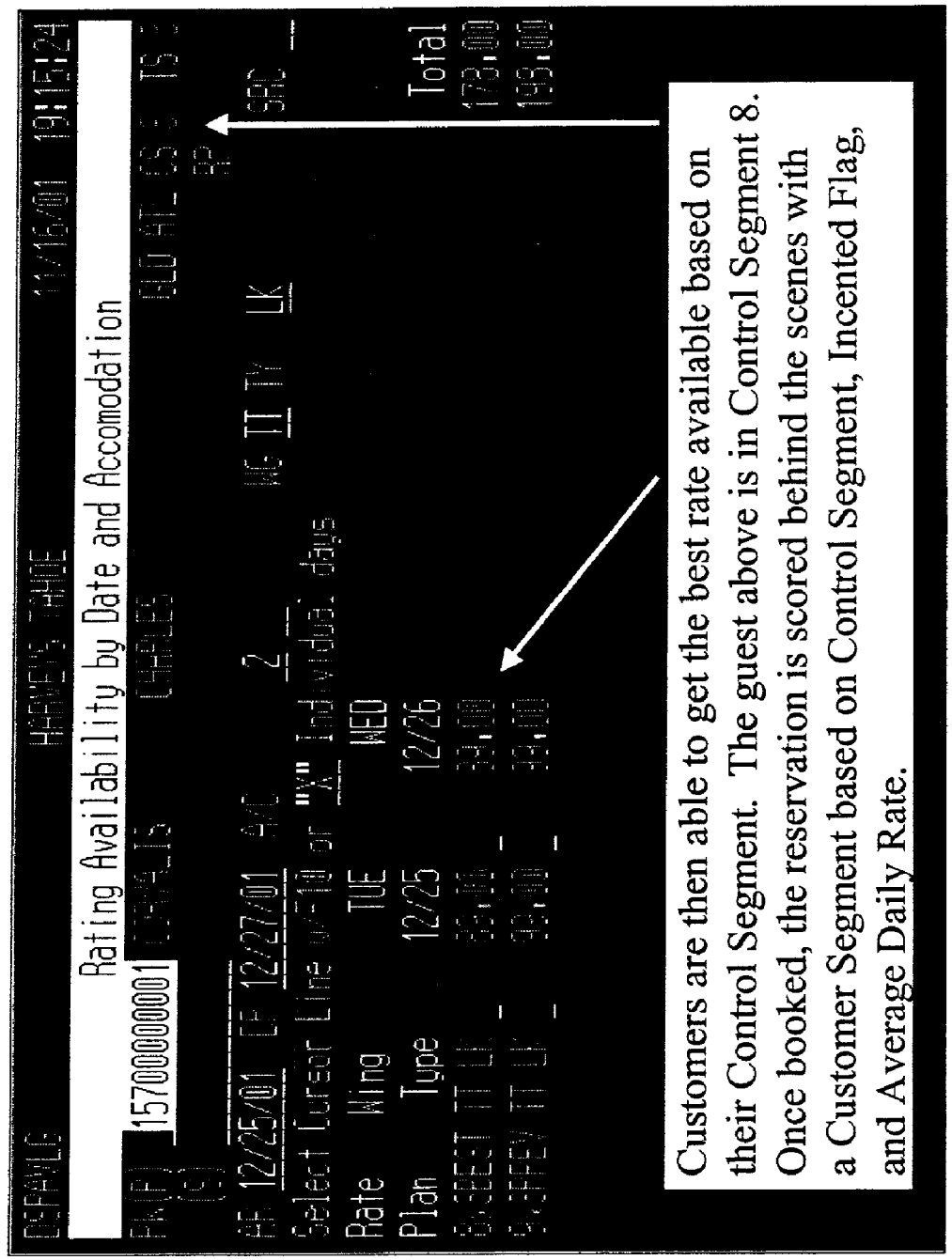
FIG. 16 is an example screen shot of a reservation screen showing a best rate available based on a determined customer value.

FIG. 16 shows an example screen used during the reservations operation. In the example shown, the customer has been placed into control segment 8, which yields a room rate (e.g., $89/night). The rate is then offered to the customer, who then books a room (resulting in a customer segment). In the described embodiment, a "prevailing rate" is also displayed (e.g., $99/night). This rate is displayed so that an operator can tell the customer how much money he is saving.

When a customer settles (checks out of his room), his actual daily profit for the trip is determined and stored using a method similar to that described above for determination of an expected daily profit in the reservations operation.

TABLE 1

Control Segments and Customer Segments

| PROPID | CTLSEG | CSTSEG | KNOWN | MINPROF | MAXPROF | INCENT | MINCOST | MAXCOST | RATEDESC |
|---|---|---|---|---|---|---|---|---|---|
| 104 | 0 | 1 | A | 1400 | 999999999 | I | 0 | 999999999 | CP |
| 104 | 0 | 2 | A | 1400 | 999999999 | U | 0 | 999999999 | CP |
| 104 | 0 | 3 | B | 840 | 1399 | I | 0 | 999999999 | CP |
| 104 | 0 | 4 | B | 840 | 1399 | U | 0 | 999999999 | CP |
| 104 | 0 | 5 | C | 560 | 839 | I | 0 | 999999999 | CP |
| 104 | 0 | 6 | C | 560 | 839 | U | 0 | 999999999 | CP |
| 104 | 0 | 7 | D | 392 | 559 | I | 0 | 999999999 | CP |
| 104 | 0 | 8 | D | 392 | 559 | U | 0 | 999999999 | CP |
| 104 | 0 | 9 | E | 224 | 391 | I | 0 | 999999999 | CP |
| 104 | 0 | 10 | E | 224 | 391 | U | 0 | 999999999 | CP |
| 104 | 0 | 11 | E | 224 | 391 | U | 0 | 999999999 | C1 |
| 104 | 0 | 12 | E | 224 | 391 | I | 0 | 999999999 | P1 |
| 104 | 3 | 13 | K | 140 | 223 | I | 0 | 999999999 | CP |
| 104 | 3 | 14 | K | 140 | 223 | U | 0 | 999999999 | CP |
| 104 | 3 | 15 | K | 140 | 223 | U | 0 | 999999999 | C1 |
| 104 | 3 | 16 | K | 140 | 223 | I | 0 | 999999999 | P1 |
| 104 | 3 | 17 | K | 140 | 223 | U | 0 | 999999999 | DS |
| 104 | 4 | 18 | K | 112 | 139 | I | 0 | 999999999 | CP |
| 104 | 4 | 19 | K | 112 | 139 | U | 0 | 999999999 | CP |
| 104 | 4 | 20 | K | 112 | 139 | U | 0 | 999999999 | C1 |
| 104 | 4 | 21 | K | 112 | 139 | I | 0 | 999999999 | P1 |
| 104 | 4 | 22 | K | 112 | 139 | U | 0 | 999999999 | DS |
| 104 | 5 | 23 | K | 84 | 111 | I | 0 | 999999999 | CP |
| 104 | 5 | 24 | K | 84 | 111 | U | 0 | 999999999 | CP |
| 104 | 5 | 25 | K | 84 | 111 | U | 0 | 999999999 | C1 |
| 104 | 5 | 26 | K | 84 | 111 | I | 0 | 999999999 | P1 |
| 104 | 5 | 27 | K | 84 | 111 | U | 0 | 999999999 | DS |
| 104 | 6 | 28 | K | 60 | 83 | I | 0 | 999999999 | CP |
| 104 | 6 | 29 | K | 60 | 83 | U | 0 | 999999999 | CP |
| 104 | 6 | 30 | K | 60 | 83 | U | 0 | 999999999 | C1 |
| 104 | 6 | 31 | K | 60 | 83 | I | 0 | 999999999 | P1 |
| 104 | 6 | 32 | K | 60 | 83 | U | 0 | 999999999 | DS |
| 104 | 7 | 33 | K | 30 | 59 | I | 0 | 999999999 | CP |
| 104 | 7 | 34 | K | 30 | 59 | U | 0 | 999999999 | C1 |
| 104 | 7 | 35 | K | 30 | 59 | I | 0 | 999999999 | P1 |
| 104 | 7 | 36 | K | 30 | 59 | U | 206 | 999999999 | 01 |
| 104 | 7 | 37 | K | 30 | 59 | U | 166 | 205 | 02 |
| 104 | 7 | 38 | K | 30 | 59 | U | 136 | 165 | 03 |
| 104 | 7 | 39 | K | 30 | 59 | U | 121 | 135 | 04 |
| 104 | 7 | 40 | K | 30 | 59 | U | 106 | 120 | 05 |
| 104 | 7 | 41 | K | 30 | 59 | U | 91 | 105 | 06 |
| 104 | 7 | 42 | K | 30 | 59 | U | 76 | 90 | 07 |
| 104 | 7 | 43 | K | 30 | 59 | U | 56 | 75 | 08 |
| 104 | 8 | 44 | K | 0 | 29 | I | 0 | 99999999 | CP |
| 104 | 8 | 45 | K | 0 | 29 | U | 0 | 999999999 | C1 |
| 104 | 8 | 46 | K | 0 | 29 | I | 0 | 999999999 | P1 |
| 104 | 8 | 47 | K | 0 | 29 | U | 206 | 999999999 | 01 |
| 104 | 8 | 48 | K | 0 | 29 | U | 166 | 205 | 02 |
| 104 | 8 | 49 | K | 0 | 29 | U | 136 | 165 | 03 |
| 104 | 8 | 50 | K | 0 | 29 | U | 121 | 135 | 04 |
| 104 | 8 | 51 | K | 0 | 29 | U | 106 | 120 | 05 |
| 104 | 8 | 52 | K | 0 | 29 | U | 91 | 105 | 06 |
| 104 | 8 | 53 | K | 0 | 29 | U | 76 | 90 | 07 |
| 104 | 8 | 54 | K | 0 | 29 | U | 65 | 75 | 08 |
| 104 | 9 | 55 | U | 0 | 99 | U | 206 | 999999999 | 01 |
| 104 | 9 | 56 | U | 0 | 99 | U | 166 | 205 | 02 |
| 104 | 9 | 57 | U | 0 | 99 | U | 136 | 165 | 03 |
| 104 | 9 | 58 | U | 0 | 99 | U | 121 | 135 | 04 |
| 104 | 9 | 59 | U | 0 | 99 | U | 106 | 120 | 05 |
| 104 | 9 | 60 | U | 0 | 99 | U | 91 | 105 | 06 |

TABLE 1-continued

Control Segments and Customer Segments

| PROPID | CTLSEG | CSTSEG | KNOWN | MINPROF | MAXPROF | INCENT | MINCOST | MAXCOST | RATEDESC |
|---|---|---|---|---|---|---|---|---|---|
| 104 | 9 | 61 | U | 0 | 99 | U | 76 | 90 | 07 |
| 104 | 9 | 62 | U | 0 | 99 | U | 65 | 75 | 08 |
| 104 | 9 | 64 | U | 0 | 99 | U | 0 | 64 | BM |

TABLE 2

Property-specific Flags and Values

| PROPCD | USEHTL | MIN-TRIP | DEFTHEO | GSTMULT | DEFADR |
|---|---|---|---|---|---|
| 104 | N | 2 | 20 | 1.0 | 250 |

TABLE 3

Daily Profit Determination

| PROPCD | MINTHEO | MAXTHEO | GMTYPE | MULT |
|---|---|---|---|---|
| 104 | 0 | 149 | SLT | .60 |
| 104 | 150 | 999999999 | SLT | .56 |
| 104 | 0 | 112 | GAM | .39 |
| 104 | 113 | 149 | GAM | .49 |
| 104 | 150 | 999999999 | GAM | .56 |
| 104 | 0 | 106 | OTHER | .59 |
| 104 | 107 | 999999999 | OTHER | .56 |

TABLE 4

Nightly profit Determination

| PROPCD | MINTHEO | MAXTHEO | NIGHTS | MULT |
|---|---|---|---|---|
| 104 | 0 | 999999999 | 1 | 1.50 |
| 104 | 0 | 999999999 | 2 | 1.25 |
| 104 | 0 | 999999999 | 3 | 1.10 |
| 104 | 0 | 999999999 | 4 | 1.00 |

From the above description, it will be apparent that the invention disclosed herein provides a novel and advantageous system and method of optimizing prices for a resource, by taking into account multiple value sources, including indirect value. The foregoing discussion discloses and describes merely exemplary methods and embodiments of the present invention. In particular, the above-described embodiments present the invention in the context of a casino/hotel operation in which room rates are optimized based on actual or expected gaming value of customers. As will be understood by those familiar with the art, the invention may be embodied in other specific forms without departing from the spirit or essential characteristics thereof. For example, other operational architectures, data formats, architectures, applications, user interfaces, and process flow schemes may be used. Accordingly, the disclosure of the present invention is intended to be illustrative, but not limiting, of the scope of the invention, which is set forth in the following claims.

What is claimed is:

1. A computer-implemented method of determining a customer valuation for a specific property, comprising:
   receiving a request for a resource for the specific property for a customer;
   using the computer to perform a valuing operation for the customer based at least on gambling activities, stored in a database, of the customer at two or more properties, where the customer value is specific to the property;
   using the computer to determine a cost of the requested resource in accordance with the customer valuation, the cost being stored in a memory of the computer; and
   returning a customer segment, expected nightly profit, and an indication of whether the customer is incentivized to a resource manager so that the resource manager determines a price for the resource, where the resource manager is a software program.

2. The method of claim 1, wherein the customer gambling activities are located at properties different from the property for which the customer is being valued.

3. A computer-implemented method of determining a customer valuation for a specific property, comprising:
   receiving a request for a resource for the specific property for a customer;
   using the computer to perform a valuing operation for the customer based at least on gambling activities, stored in a database, of the customer at two or more properties, where the customer value is specific to the property, where valuing the customer comprises:
   determining a theoretical win for the customer;
   determining daily profits for the customer in accordance with the theoretical win; and
   determining a customer segment in accordance with the daily profits; and
   using the computer to determine a cost of the requested resource in accordance with the customer valuation, the cost being stored in a memory of the computer.

4. The method of claim 3, further comprising determining whether the customer should be incentivized.

5. The method of claim 3, further comprising adjusting the daily profits in accordance with the number of nights that the customer stays in a property overnight.

6. The method of claim 3, further including determining the customer segment in accordance with total nightly profits.

7. A computer-implemented method of determining a customer valuation for a specific property, comprising:
   receiving a request for a resource for the specific property for a customer;
   using the computer to perform a valuing operation for the customer based at least on gambling activities, stored in a database, of the customer at two or more properties, where the customer value is specific to the property, wherein valuing the customer is also based on the fact that a first type of game is less profitable than other types of games; and using the computer to determine a cost of the requested resource in accordance with the customer valuation, the cost being stored in a memory of the computer.

8. A computer-implemented method of determining a customer valuation for a specific property, comprising:
receiving a request for a resource for the specific property for a customer;
using the computer to perform a valuing operation for the customer based at least on gambling activities, stored in a database, of the customer at two or more properties, where the customer value is specific to the property, wherein valuing the customer also includes determining whether there are to be multiple customers in a room; and
using the computer to determine a cost of the requested resource in accordance with the customer valuation, the cost being stored in a memory of the computer.

9. A computer-implemented method of determining a customer valuation for a specific property, comprising:
receiving a request for a resource for the specific property for a customer;
using the computer to perform a valuing operation for the customer based at least on gambling activities, stored in a database, of the customer at two or more properties, where the customer value is specific to the property, wherein valuing the customer also includes determining a default theoretical win for the customer when there is no data from previous trips of the customer to one or more of the properties; and
using the computer to determine a cost of the requested resource in accordance with the customer valuation, the cost being stored in a memory of the computer.

10. A computer-implemented method of determining a customer valuation for a specific property, comprising:
receiving a request for a resource for the specific property for a customer;
using the computer to perform a valuing operation for the customer based at least on gambling activities, stored in a database, of the customer at two or more properties, where the customer value is specific to the property, wherein valuing the customer also includes determining an actual theoretical win for the customer based on data from previous trips of the customer to one or more of the properties; and
using the computer to determine a cost of the requested resource in accordance with the customer valuation, the cost being stored in a memory of the computer.

11. A computer-implemented method of determining a customer valuation for a specific property, comprising:
receiving a request for a resource for the specific property for a customer;
using the computer to perform a valuing operation for the customer based at least on gambling activities, stored in a database, of the customer at two or more properties, where the customer value is specific to the property, wherein valuing the customer also includes determining an average daily profit for the customer based on data from previous trips of the customer to one or more of the properties, by gaming type; and
using the computer to determine a cost of the requested resource in accordance with the customer valuation, the cost being stored in a memory of the computer.

12. A computer-implemented method of determining a customer valuation for a specific property, comprising:
receiving a request for a resource for the specific property for a customer;
using the computer to perform a valuing operation for the customer based at least on gambling activities, stored in a database, of the customer at two or more properties, where the customer value is specific to the property, wherein valuing the customer uses a default source theoretical win value when there is no data on the customer's previous trips to one or more of the properties and the source of the customer is known; and
using the computer to determine a cost of the requested resource in accordance with the customer valuation, the cost being stored in a memory of the computer.

13. A computer-implemented method of determining a customer valuation for a specific property, comprising:
receiving a request for a resource for the specific property for a customer;
using the computer to perform a valuing operation for the customer based at least on gambling activities, stored in a database, of the customer at two or more properties, where the customer value is specific to the property, wherein valuing the customer uses a default theoretical win value specific to the property when there is no data on the customer's previous trips to one or more of the properties and the source of the customer is not known; and
using the computer to determine a cost of the requested resource in accordance with the customer valuation, the cost being stored in a memory of the computer.

14. The method of claim 1, wherein valuing the customer uses data based on the customer's previous trips to hotels only.

15. A system for determining a customer valuation for a specific property, comprising:
a user interface receiving a request for a resource for the specific property for a customer; and
a customer valuation system, valuing the customer based at least on gambling activities of the customer at two or more properties, where the customer value is specific to the property; and
a resource manager that receives a customer segment, expected nightly profit, and an indication of whether the customer is incentivized so that the resource manager determines a price for the resource.

16. A computer-implemented method of determining a customer value for a first property, comprising:
receiving a request for a resource for the first property for a customer;
using the computer to perform a valuing operation for the customer based at least on gambling activities, stored in a database, of the customer at two or more other properties, where the customer value is specific to the first property and where the gambling activities at the two or more other properties would result in a different valuation for the customer at a second property that is different from the first property, wherein valuing the customer also includes determining an actual theoretical win for the customer based on data from previous trips of the customer to one or more of the properties; and
using the computer to determine a cost of the requested resource in accordance with the customer valuation, the cost being stored in a memory of the computer.

* * * * *